(12) United States Patent
Kakinoki et al.

(10) Patent No.: US 11,620,025 B2
(45) Date of Patent: Apr. 4, 2023

(54) INPUT DETECTION SYSTEM TO DETECT INPUT SUPPORT DEVICE AND INPUT SUPPORT DEVICE

(71) Applicant: Japan Display Inc., Tokyo (JP)

(72) Inventors: Yuto Kakinoki, Tokyo (JP); Makoto Hayashi, Tokyo (JP); Takaaki Kono, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/497,070

(22) Filed: Oct. 8, 2021

(65) Prior Publication Data

US 2022/0147189 A1 May 12, 2022

(30) Foreign Application Priority Data

Nov. 6, 2020 (JP) .............................. JP2020-185930

(51) Int. Cl.
*G06F 3/044* (2006.01)
*G06F 3/041* (2006.01)

(52) U.S. Cl.
CPC ........ *G06F 3/0446* (2019.05); *G06F 3/04162* (2019.05)

(58) Field of Classification Search
CPC .... G06F 3/0446; G06F 3/04162; G06F 3/033; G06F 3/0354; G06F 3/03545; G06F 3/0441; G06F 3/0442
See application file for complete search history.

(56) References Cited

U.S. PATENT DOCUMENTS

| 9,477,859 | B2* | 10/2016 | Lefevre | .............. G06K 7/10039 |
| 2005/0083318 | A1* | 4/2005 | Rix | ....................... H01H 13/705 345/179 |
| 2017/0336897 | A1* | 11/2017 | Zachut | ................... G06F 3/046 |
| 2020/0301547 | A1 | 9/2020 | Mori et al. | |
| 2021/0232269 | A1 | 7/2021 | Sasaki et al. | |

FOREIGN PATENT DOCUMENTS

| JP | 6342105 B1 | 5/2018 |
| JP | 6532631 B1 | 5/2019 |

OTHER PUBLICATIONS

C. Park et al., "A pen-pressure-sensitive capacitive touch system using electrically coupled resonance pen", IEEE J. Solid-State Circuits, vol. 51, No. 1, pp. 168-176, Jan. 2016.

* cited by examiner

*Primary Examiner* — Lisa S Landis
(74) *Attorney, Agent, or Firm* — K&L Gates LLP

(57) ABSTRACT

An input detection system includes a plurality of electrodes arrayed in a detection region, and an input support device including an LC circuit, a first electrode coupled to the LC circuit and arranged so as to overlap with at least equal to or more than one of the electrodes, and a housing accommodating therein at least the LC circuit. The housing is a conductor, and one end side of the LC circuit is coupled to the housing through a coupling member or a capacitor and another end side of the LC circuit is coupled to the first electrode.

16 Claims, 22 Drawing Sheets

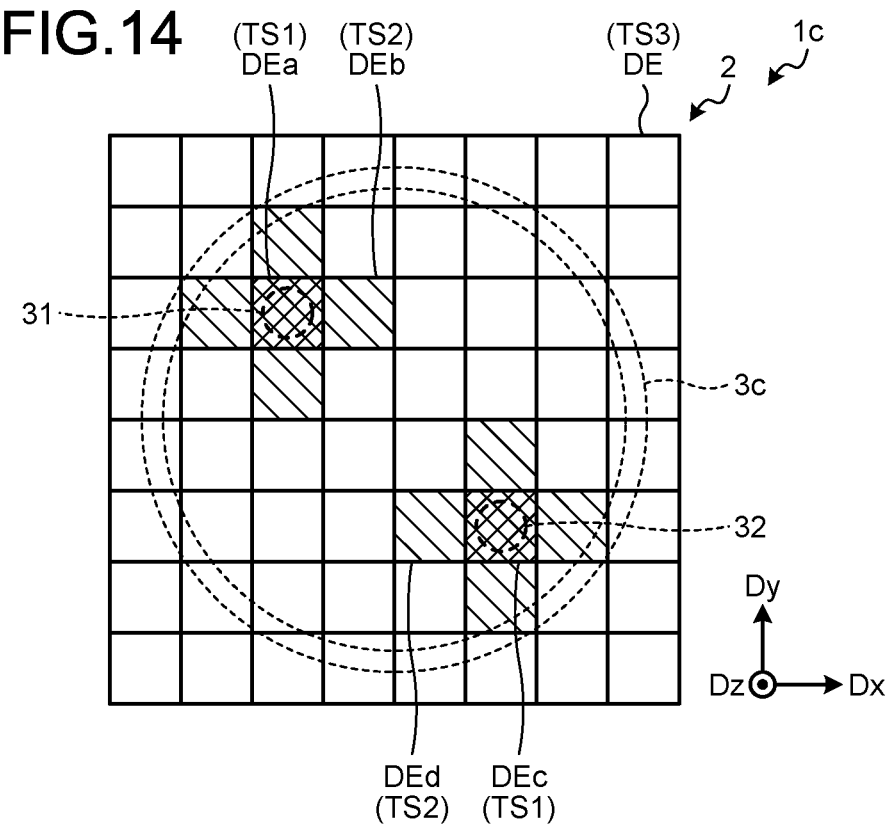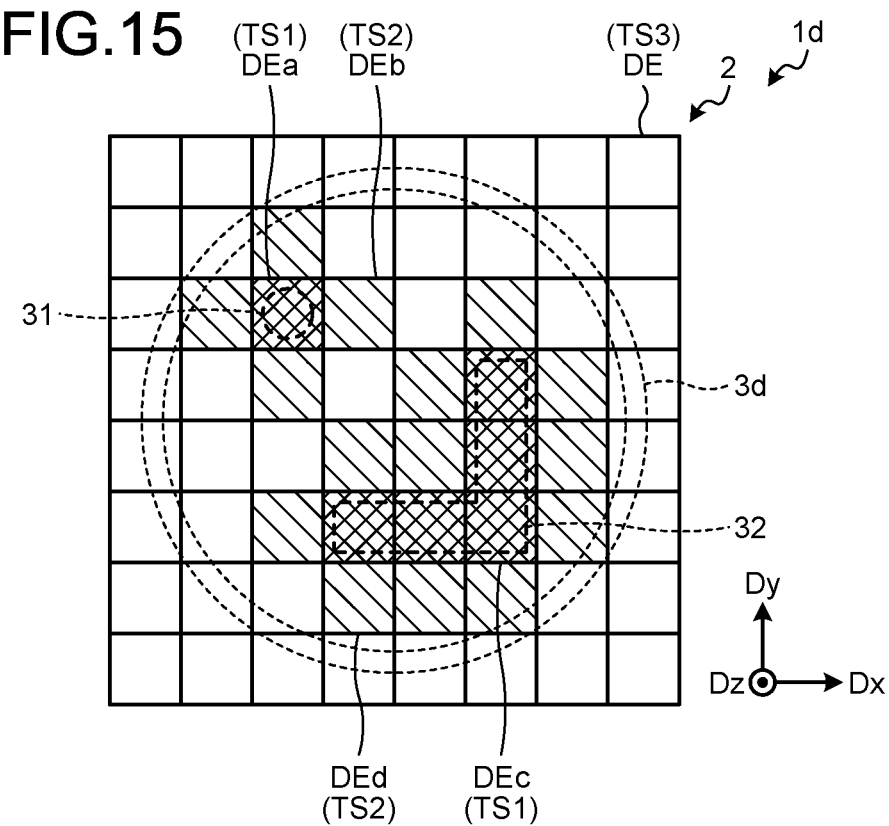

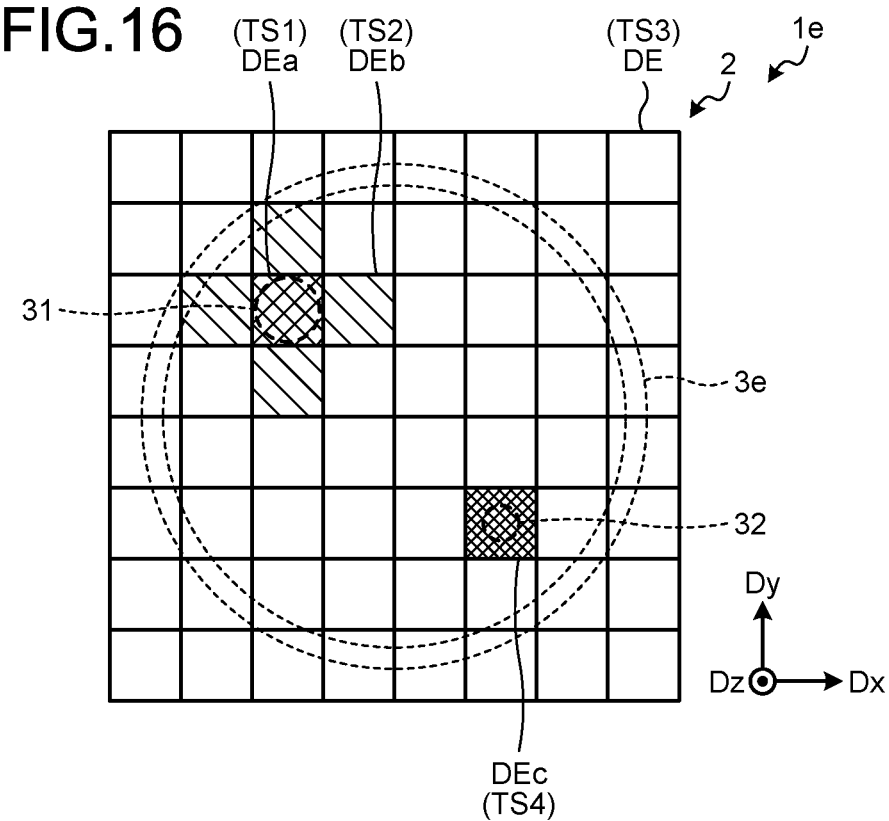
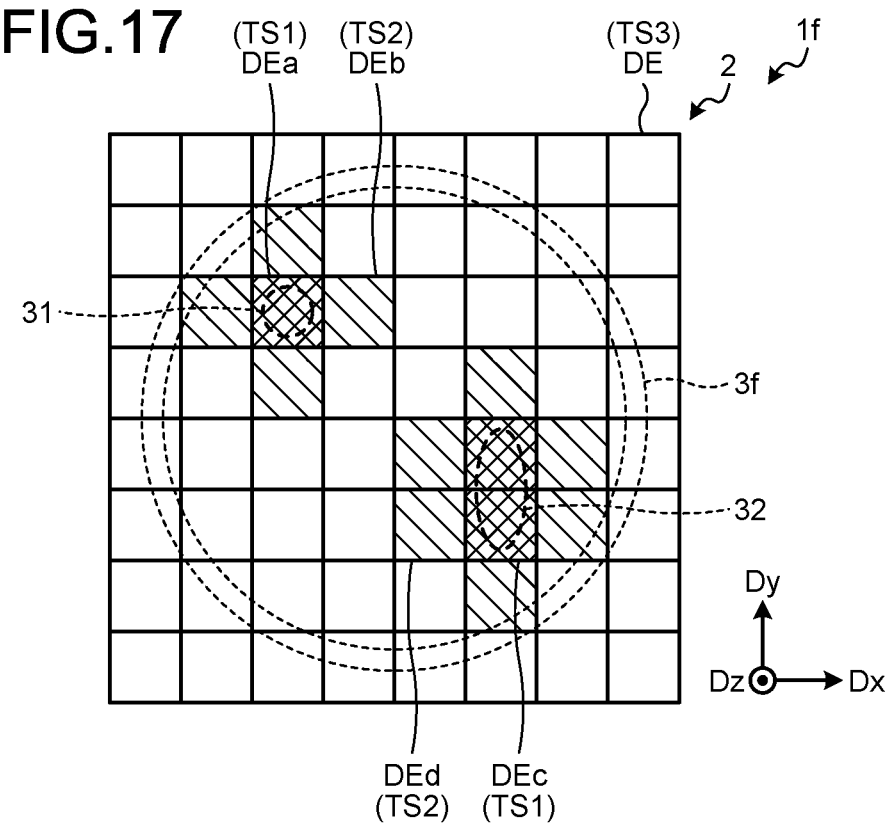

INPUT DETECTION SYSTEM TO DETECT INPUT SUPPORT DEVICE AND INPUT SUPPORT DEVICE

CROSS-REFERENCE TO RELATED APPLICATION

This application claims the benefit of priority from Japanese Patent Application No. 2020-185930 filed on Nov. 6, 2020, the entire contents of which are incorporated herein by reference.

BACKGROUND

1. Technical Field

The present disclosure relates to an input detection system and an input support device.

2. Description of the Related Art

Japanese Patent Publication Nos. 6342105 and 6532631 describe an input support device (expressed as an operation knob or a knob in Japanese Patent Publication Nos. 6342105 and 6532631) that is placed on a touch panel configured to detect change in electrostatic capacitance or change in a contact region and supports input operations through the touch panel. Japanese Patent Publication No. 6532631 describes that a frequency of a drive signal to be applied to electrodes is changed and frequency characteristics of impedance of the input support device brought into contact with the touch panel are provided based on detection signals provided from the same electrodes. C. Park et al., "A pen-pressure-sensitive capacitive touch system using electrically coupled resonance pen", IEEE J. Solid-State Circuits, vol. 51, no. 1, pp. 168-176, January 2016 describes a pen-type input support device.

As for the above-mentioned input support device, whether an object to be detected is the input support device or an object (for example, a finger) other than the input support device needs to be determined. In Japanese Patent Publication Nos. 6342105 and 6532631, the object to be detected is determined by providing equal to or more than three electrodes of the input support device or combining a plurality of detection systems. Detection of the input support device can therefore be troublesome.

SUMMARY

An input detection system according to an aspect of the present disclosure includes a plurality of electrodes arrayed in a detection region, and an input support device including an LC circuit, a first electrode coupled to the LC circuit and arranged so as to overlap with at least equal to or more than one of the electrodes, and a housing accommodating therein at least the LC circuit. The housing is a conductor, and one end side of the LC circuit is coupled to the housing through a coupling member or a capacitor and the other end side of the LC circuit is coupled to the first electrode.

An input support device according to another aspect of the present disclosure includes an LC circuit, a first electrode coupled to the LC circuit, and a housing accommodating therein at least the LC circuit. The housing is a conductor, and one end side of the LC circuit is coupled to the housing through a coupling member or a capacitor and the other end side of the LC circuit is coupled to the first electrode.

BRIEF DESCRIPTION OF THE DRAWINGS

FIG. 14 is a plan view schematically illustrating the input support device and a plurality of detection electrodes in the second embodiment;

FIG. 15 is a plan view schematically illustrating an input support device and a plurality of detection electrodes in a third modification;

FIG. 16 is a plan view schematically illustrating an input support device and a plurality of detection electrodes in a fourth modification;

FIG. 17 is a plan view schematically illustrating an input support device and a plurality of detection electrodes in a fifth modification;

DETAILED DESCRIPTION

Figure 1:
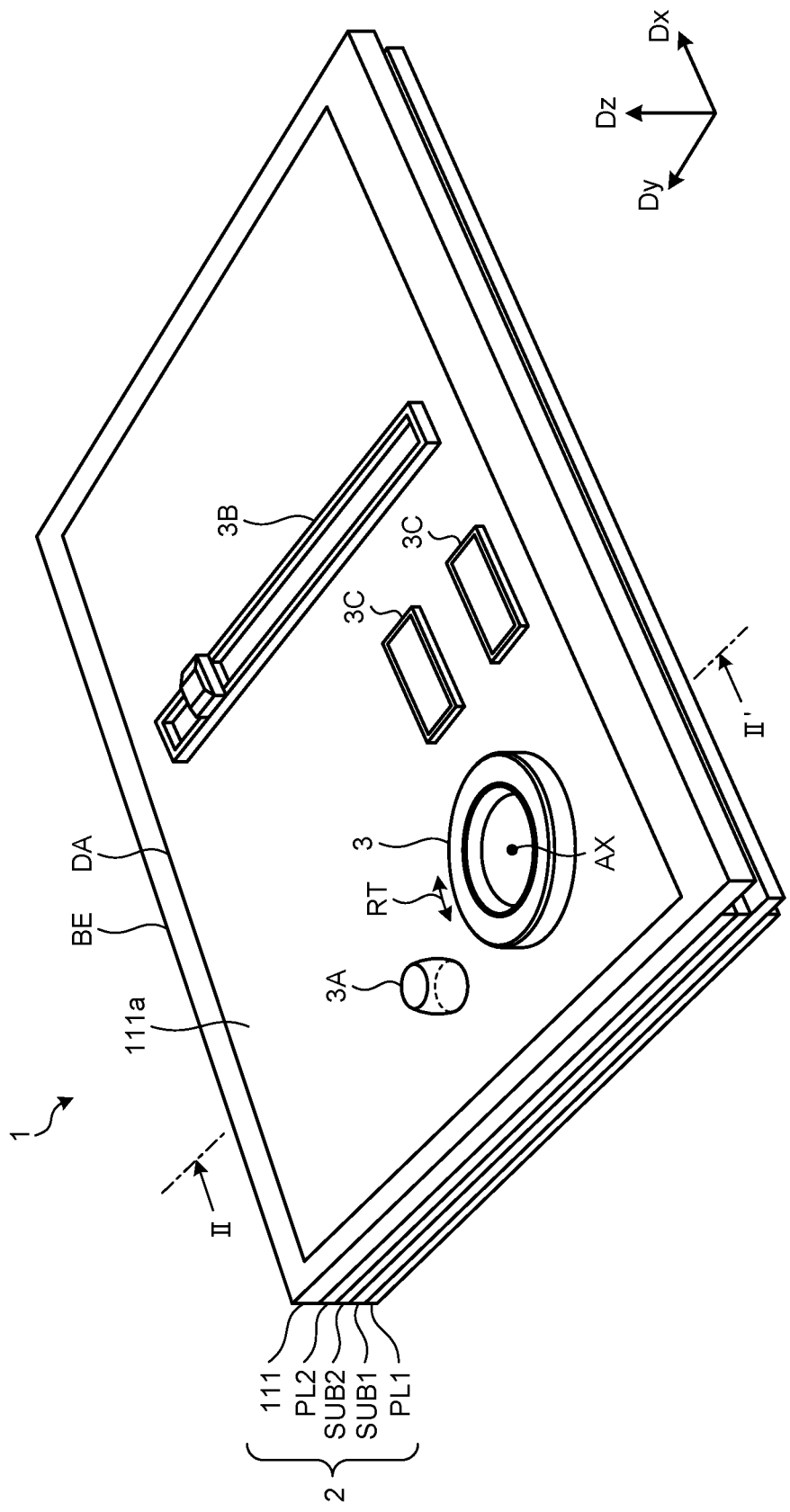
FIG. 1 is a perspective view schematically illustrating an input detection system according to a first embodiment.

Modes for carrying out the present disclosure (embodiments) will be described in detail with reference to the drawings. Contents described in the following embodiment do not limit the present disclosure. Components described below include those that can be easily assumed by those skilled in the art and substantially the same components. Furthermore, the components described below can be appropriately combined. What is disclosed herein is merely an example, and it is needless to say that appropriate modifications within the gist of the present disclosure at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present disclosure and the drawings, the same reference numerals denote components similar to those described before with reference to the drawing that has already been referred, and detail explanation thereof can be appropriately omitted.

In the present specification and the scope of the claims, when a mode in which a second structure is arranged above a first structure is represented, simple expression "above" includes both the case in which the second structure is arranged immediately above the first structure in a manner contacting the first structure, and the case in which the second structure is arranged above the first structure with still a third structure interposed therebetween, unless otherwise specified.

First Embodiment

Figure 2:
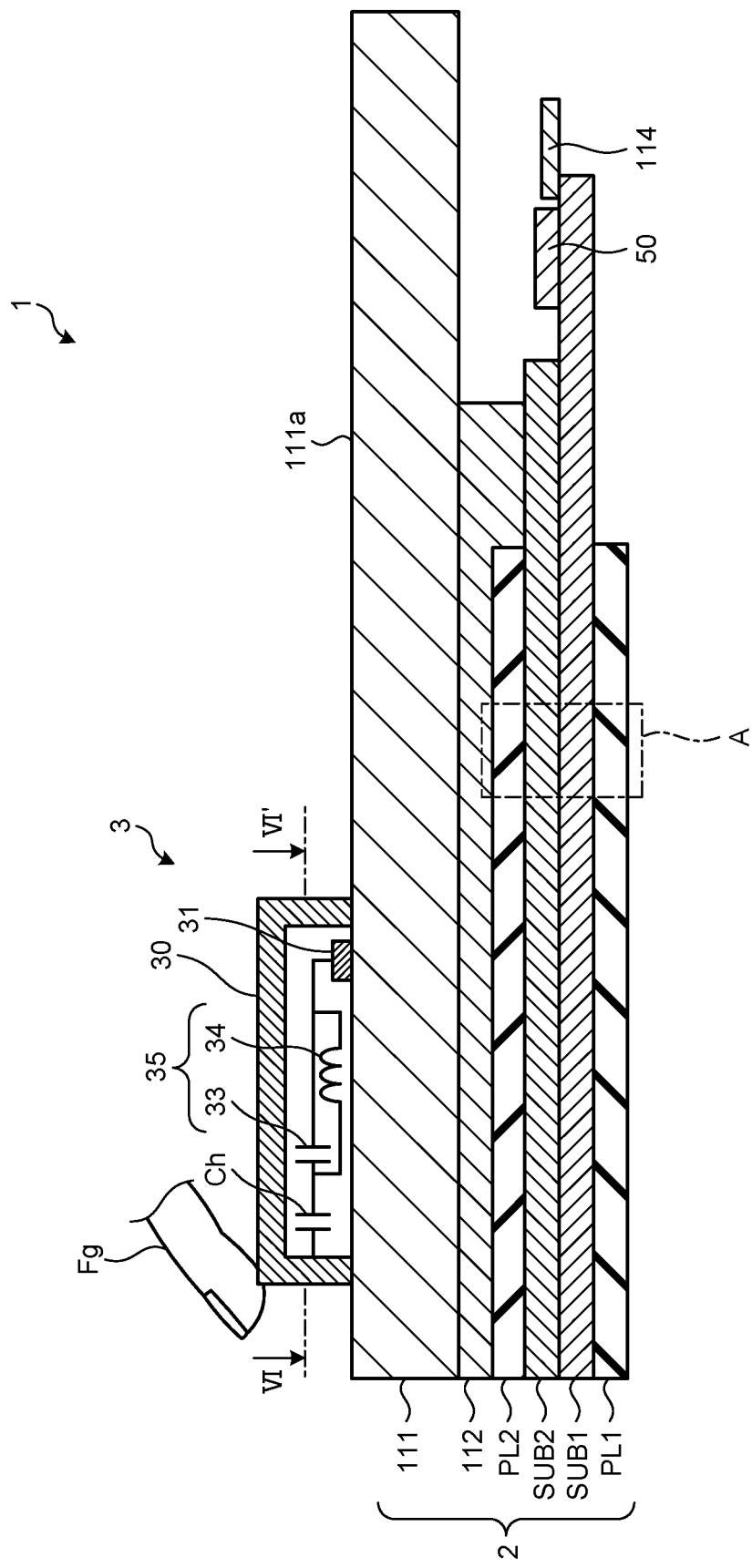
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIG. 1 and FIG. 2, an input detection system 1 includes a display device 2 and an input support device (input device) 3.

One direction of a plane (upper surface 111a) of the display device 2 is a first direction Dx, and a direction orthogonal to the first direction Dx is a second direction Dy. The second direction Dy is not limited thereto and may intersect with the first direction Dx at an angle other than 90°. A third direction Dz orthogonal to the first direction Dx and the second direction Dy corresponds to the thickness direction of an array substrate SUB1.

As illustrated in FIG. 1, the display device 2 includes the array substrate SUB1, a counter substrate SUB2, a first polarizing plate PL1, a second polarizing plate PL2, a cover member 111, and an adhesive layer 112 (see FIG. 2). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The array substrate SUB1 includes switching elements Tr provided on the first substrate 10 and various wiring lines such as scan lines GL and pixel signal lines SL (see FIG. 4). The counter substrate SUB2 is provided so as to face the array substrate SUB1 and includes a second substrate 20 as a base body. The counter substrate SUB2 includes color filters CF and a light shielding layer BM (see FIG. 3) provided on the second substrate 20. The first substrate 10 and the second substrate 20 are made of a material having a light transmitting property, such as a glass substrate and a resin substrate.

The length of the array substrate SUB1 in the second direction Dy is larger than the length of the counter substrate SUB2 in the second direction Dy. As illustrated in FIG. 1, the array substrate SUB1 (first substrate 10) has a portion (protruding portion) projecting to the outer side of the counter substrate SUB2 (second substrate 20). The lengths of the array substrate SUB1 and the counter substrate SUB2 in the second direction Dy are smaller than the lengths thereof in the first direction Dx. The lengths are not limited to the ones being set in this manner, and the lengths of the array substrate SUB1 and the counter substrate SUB2 in the second direction Dy may be larger than the lengths thereof in the first direction Dx.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially square shape with curved corners or may have a cutout. Alternatively, the display region DA may have another polygonal shape or another shape such as a circular shape and an elliptic shape.

The display region DA is a region for displaying an image and is a region in which the pixels PX are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

As illustrated in FIG. 2, a display integrated circuit (IC) 50 and a wiring substrate 114 are coupled to the protruding portion of the array substrate SUB1. The display IC 50 includes a control circuit that controls display and touch detection of the display device 2. The display IC 50 is not limited to this example and may be mounted on the wiring substrate 114. Arrangement of the display IC 50 is not limited thereto, and the display IC 50 may be provided above a control substrate or a flexible substrate outside the module, for example.

The wiring substrate 114 is configured by a flexible printed circuit (FPC), for example. The wiring substrate 114 is coupled to a plurality of terminals of the first substrate 10.

As illustrated in FIG. 1 and FIG. 2, the input support device 3 is arranged (mounted) on the upper surface 111a of the cover member 111 for use. A user operates the input support device 3 arranged above the display device 2 to perform an input operation on the display device 2. The input support device 3 is, for example, a rotary knob and has an annular shape in a plan view when seen from the upper surface 111a of the display device 2. The display device 2 can detect a position of the input support device 3 in a plane and a rotation operation RT about a rotating axis AX. That is to say, in the embodiment, the display region DA is a region in which a plurality of detection electrodes DE (see FIG. 5) are provided, and serves also as a detection region.

As illustrated in FIG. 2, the input support device 3 includes a housing 30, a first electrode 31, and an LC circuit 35. The housing 30 is formed by a conductor made of a metal material, for example, and is a hollow member in which a space is provided. The first electrode 31 and the LC circuit 35 are provided in the housing 30. The LC circuit 35 configures an LC resonance circuit in which a capacitor 33 and an inductor 34 are coupled in parallel. One end side of the LC circuit 35 (a coupling portion N1 (see FIG. 7) of the capacitor 33 and the inductor 34 on their one end sides) is coupled to the housing 30 through a capacitor Ch. The other end side of the LC circuit 35 (a coupling portion N2 (see FIG. 7) of the capacitor 33 and the inductor 34 on their other end sides) is coupled to the first electrode 31. The display device 2 can detect a position of the first electrode 31 using LC resonance of the LC circuit 35.

In the following explanation, the housing 30 has a circular shape in a plan view with no through-hole in order to schematically illustrate the LC circuit 35. The shape of the housing 30 can, however, be appropriately modified, and the housing 30 may have an annular shape with a through-hole formed in a region overlapping with the rotating axis AX as illustrated in FIG. 1.

FIG. 1 illustrates a plurality of input support devices 3A, 3B, and 3C as other examples of the input support device 3. The input support device 3A is a rotary knob and is formed into a tab shape having a smaller plane than that of the input support device 3. The input support device 3B is a slider, and an input operation can be performed by displacement of a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to the configuration in which all of the input support devices 3, 3A, 3B, and 3C are mounted, and it is sufficient that at least equal to or more than one of the input support devices 3, 3A, 3B, and 3C is provided. Hereinafter, the input support device 3 is described. Explanation of the input support device 3 can be applied also to the other input support devices 3A, 3B, and 3C.

Figure 3:
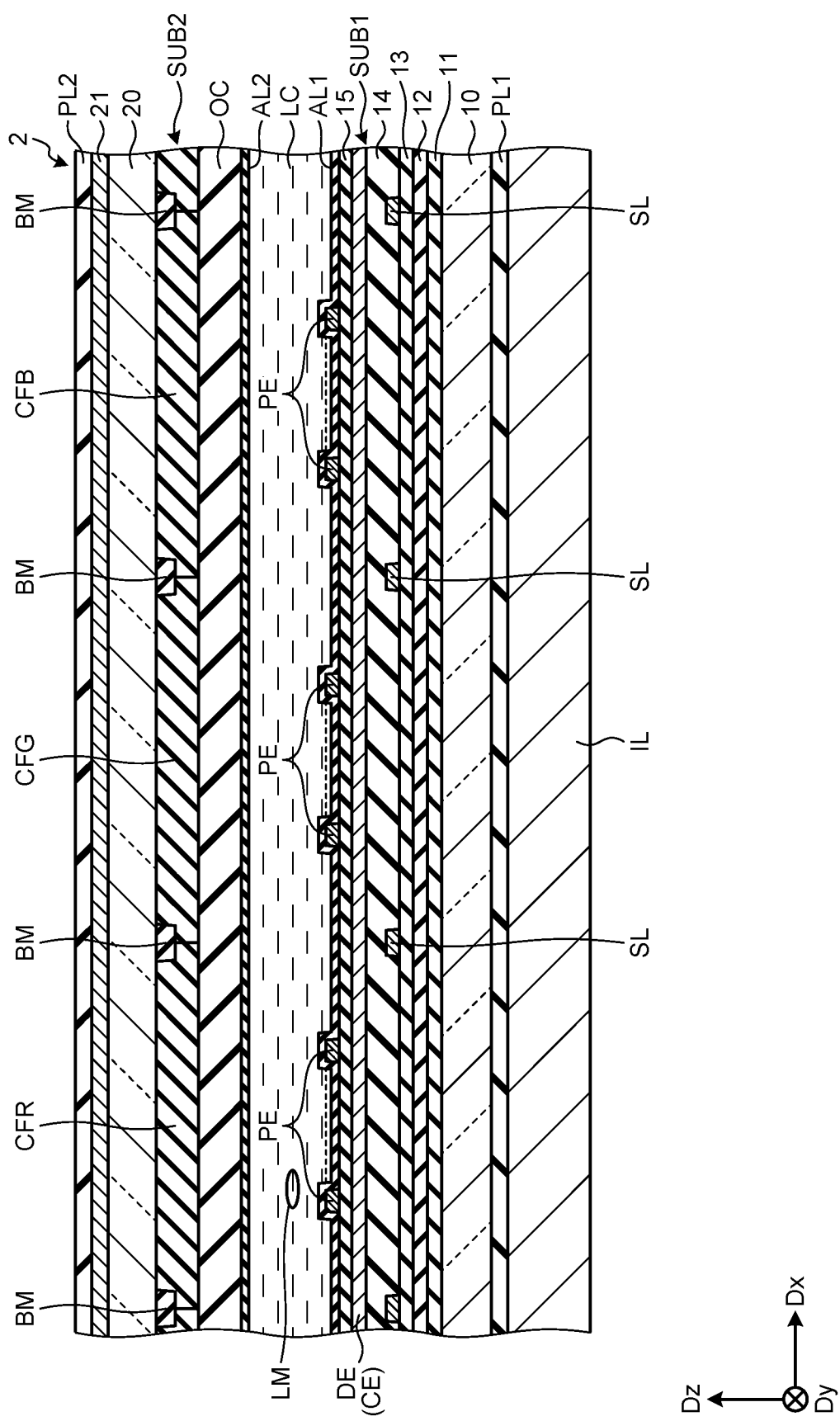
FIG. 3 is a cross-sectional view illustrating the schematic cross-sectional configuration of a display device.

FIG. 3 is a cross-sectional view illustrating the schematic cross-sectional configuration of the display device. FIG. 3 is a cross-sectional view of a part surrounded by a region A in FIG. 2, for example. As illustrated in FIG. 3, the display device 2 further includes an illumination device IL. The counter substrate SUB2 is arranged so as to face the surface of the array substrate SUB1 in the vertical direction. A liquid crystal layer LC is provided between the array substrate SUB1 and the counter substrate SUB2. The liquid crystal layer LC as a display function layer is arranged between the first substrate 10 and the second substrate 20. The illumination device IL, the first polarizing plate PL1, the array substrate SUB1, the counter substrate SUB2, and the second polarizing plate PL2 are stacked in this order in the third direction Dz.

The array substrate SUB1 faces the illumination device IL, and the counter substrate SUB2 is located on the display surface side. The illumination device IL emits light toward the array substrate SUB1. For example, a side light-type backlight or a direct-type backlight can be applied as the illumination device IL. Although various types of the illumination device IL can be applied, explanation of the detail configurations thereof is omitted.

An optical element including the first polarizing plate PL1 faces the first substrate 10. To be more specific, the first polarizing plate PL1 is arranged on the outer surface of the first substrate 10 or on the surface thereof facing the illumination device IL. An optical element including the second polarizing plate PL2 faces the second substrate 20. To be more specific, the second polarizing plate PL2 is arranged on the outer surface of the second substrate 20 or on the surface thereof on the observation position side. A first polarization axis of the first polarizing plate PL1 and a second polarization axis of the second polarizing plate PL2 have a crossed nicol positional relation in an X-Y plane, for example. The optical elements including the first polarizing plate PL1 and the second polarizing plate PL2 may include another optical function element such as a phase difference plate.

The array substrate SUB1 includes insulating films 11, 12, 13, 14, and 15, the pixel signal lines SL, pixel electrodes PE, the detection electrodes DE (common electrodes CE), and a first orientation film AL1 on the side of the first substrate 10 that faces the counter substrate SUB2.

In the present specification, the direction toward the second substrate 20 from the first substrate 10 in the direction perpendicular to the first substrate 10 is an "upper-side direction" or simply an "upward direction". The direction toward the first substrate 10 from the second substrate 20 is a "lower-side direction" or simply a "downward direction". The expression "plan view" indicates a positional relation when seen from the direction perpendicular to the first substrate 10.

The insulating film 11 is provided above the first substrate 10. The insulating films 11, 12, and 13, and the insulating film 15 are inorganic insulating films made of, for example, an inorganic material having a light transmitting property, such as silicon oxide and silicon nitride.

The insulating film 12 is provided above the insulating film 11. The insulating film 13 is provided above the insulating film 12. The pixel signal lines SL are provided above the insulating film 13. The insulating film 14 is provided above the insulating film 13 and covers the pixel signal lines SL. The insulating film 14 is made of a resin material having a light transmitting property and has a film thickness that is thicker than those of the other insulating films made of the inorganic material. Although not illustrated in FIG. 3, the scan lines GL are provided above the insulating film 12, for example.

The detection electrodes DE are provided above the insulating film 14. The detection electrodes DE are provided in the display region DA and are divided into a plurality of parts by slits. The detection electrodes DE are covered with the insulating film 15. The detection electrodes DE serve as the detection electrodes DE for touch detection and the common electrodes CE in display.

The pixel electrodes PE are provided above the insulating film 15 and face the detection electrodes DE with the insulating film 15 interposed therebetween. The pixel electrodes PE and the detection electrodes DE are made of, for example, a conductive material having a light transmitting property, such as indium tin oxide (ITO) and indium zinc oxide (IZO). The first orientation film AL1 covers the pixel electrodes PE and the insulating film 15.

The counter substrate SUB2 includes the light shielding layer BM, color filters CFR, CFG, and CFB, an overcoat layer OC, and a second orientation film AL2 on the side of the second substrate 20 that faces the array substrate SUB1. The counter substrate SUB2 includes a conductive layer 21 and the second polarizing plate PL2 on the side of the second substrate 20 that is opposite to the array substrate SUB1.

The light shielding layer BM is located on the second substrate 20 on the side facing the array substrate SUB1 in the display region DA. The light shielding layer BM defines openings that respectively face the pixel electrodes PE. The pixel electrodes PE are partitioned for the respective openings of the pixels PX. The light shielding layer BM is made of a resin material in black color or a metal material having a light shielding property.

The color filters CFR, CFG, and CFB are located on the second substrate 20 on the side facing the array substrate SUB1, and end portions thereof overlap with the light shielding layer BM. As an example, the color filters CFR, CFG, and CFB are made of a resin material colored in red, green, and blue, respectively.

The overcoat layer OC covers the color filters CFR, CFG, and CFB. The overcoat layer OC is made of a resin material having a light transmitting property. The second orientation film AL2 covers the overcoat layer OC. The first orientation film AL1 and the second orientation film AL2 are made of, for example, a material exhibiting horizontal orientation performance.

The conductive layer 21 is provided above the second substrate 20. The conductive layer 21 is made of a conductive material having a light transmitting property, such as ITO. Static electricity applied from the outside and static electricity charged to the second polarizing plate PL2 flow through the conductive layer 21. The display device 2 can remove static electricity in a short period of time and can reduce static electricity that is applied to the liquid crystal layer LC as a display layer. The conductive layer 21 may not be provided.

The array substrate SUB1 and the counter substrate SUB2 are arranged such that the first orientation film AL1 and the second orientation film AL2 face each other. The liquid crystal layer LC is enclosed into between the first orientation film AL1 and the second orientation film AL2. The liquid crystal layer LC is made of a negative liquid crystal material having a negative dielectric anisotropy or a positive liquid crystal material having a positive dielectric anisotropy.

For example, when the liquid crystal layer LC is made of the negative liquid crystal material and a state in which no voltage is applied to the liquid crystal layer LC is established, liquid crystal molecules LM are initially oriented in such a direction that long axes thereof are along the first direction Dx in the X-Y plane. On the other hand, in a state in which the voltage is applied to the liquid crystal layer LC, that is, in an ON state in which an electric field is formed between the pixel electrodes PE and drive electrodes Tx, the liquid crystal molecules LM receive influences of the electric field and orientation states thereof are changed. In the ON state, a polarization state of incident linearly polarized light is changed in accordance with the orientation states of the liquid crystal molecules LM when the light passes through the liquid crystal layer LC.

Figure 4:
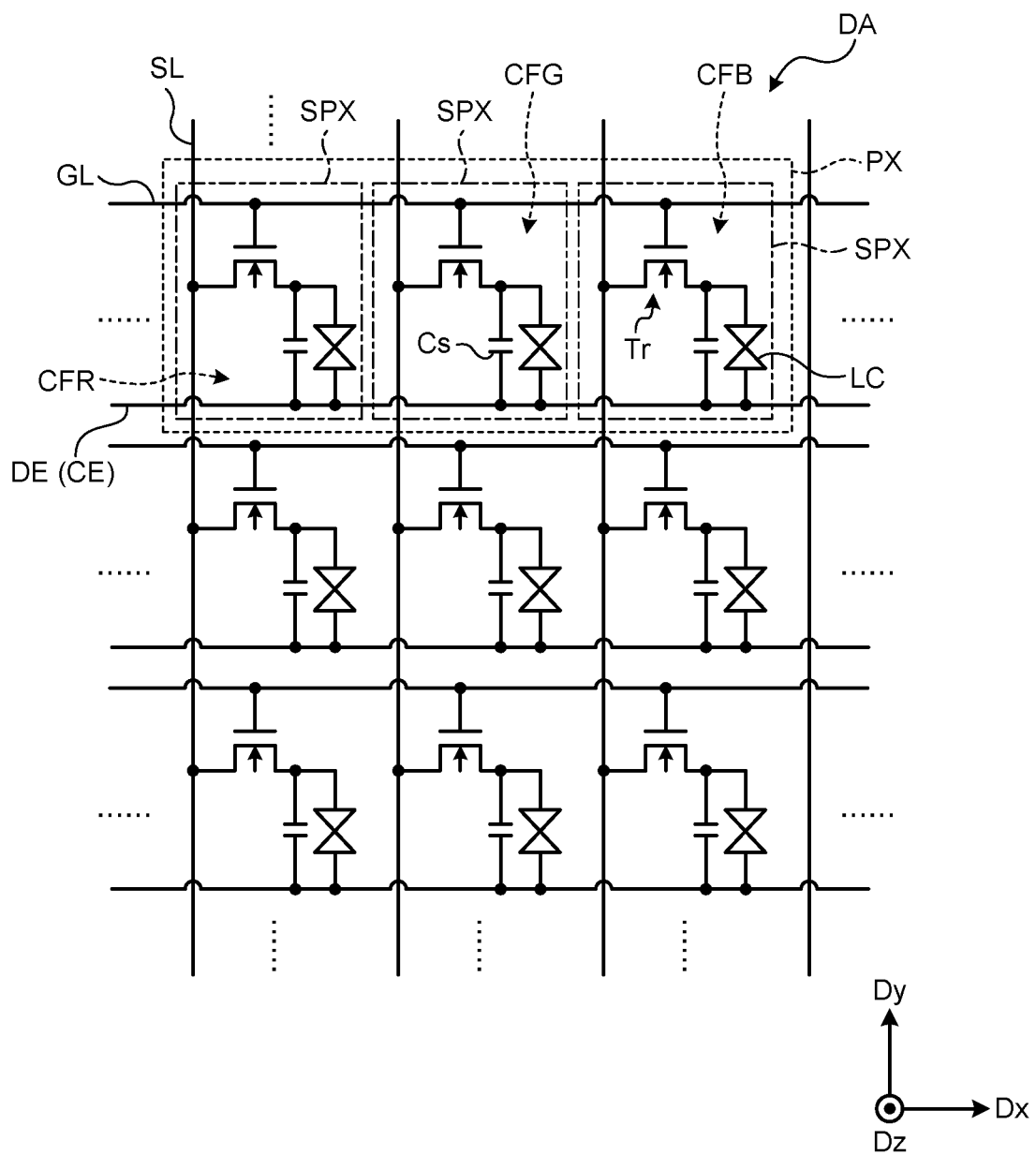
FIG. 4 is a circuit diagram illustrating pixel array of a display region.

FIG. 4 is a circuit diagram illustrating pixel array of the display region. The switching elements Tr of respective sub pixels SPX, the pixel signal lines SL, and the scan lines GL illustrated in FIG. 4, and the like are formed on the array substrate SUB1. The pixel signal lines SL extend in the second direction Dy. The pixel signal lines SL are wiring lines for supplying pixel signals to the pixel electrodes PE (see FIG. 3). The scan lines GL extend in the first direction Dx. The scan lines GL are wiring lines for supplying drive signals (scan signals) for driving the switching elements Tr.

Each pixel PX includes the sub pixels SPX. Each sub pixel SPX includes the switching element Tr and capacitance of the liquid crystal layer LC. The switching element Tr is formed by a thin film transistor and, in this example, is formed by an n-channel metal oxide semiconductor (MOS) TFT. The insulating film 15 is provided between the pixel electrodes PE and the detection electrodes DE illustrated in FIG. 3, and they form holding capacitance Cs illustrated in FIG. 4.

Color regions colored in three colors of red (R), green (G), and blue (B), for example, are periodically arrayed as the color filters CFR, CFG, and CFB. The color regions of the three colors of R, G, and B as one set are made to respectively correspond to the sub pixels SPX. A set of sub pixels SPX corresponding to the color regions of the three colors configures a pixel PX. The color filters may include color regions of equal to or more than four colors. In this case, the pixel PX may include equal to or more than four sub pixels SPX.

Figure 5:
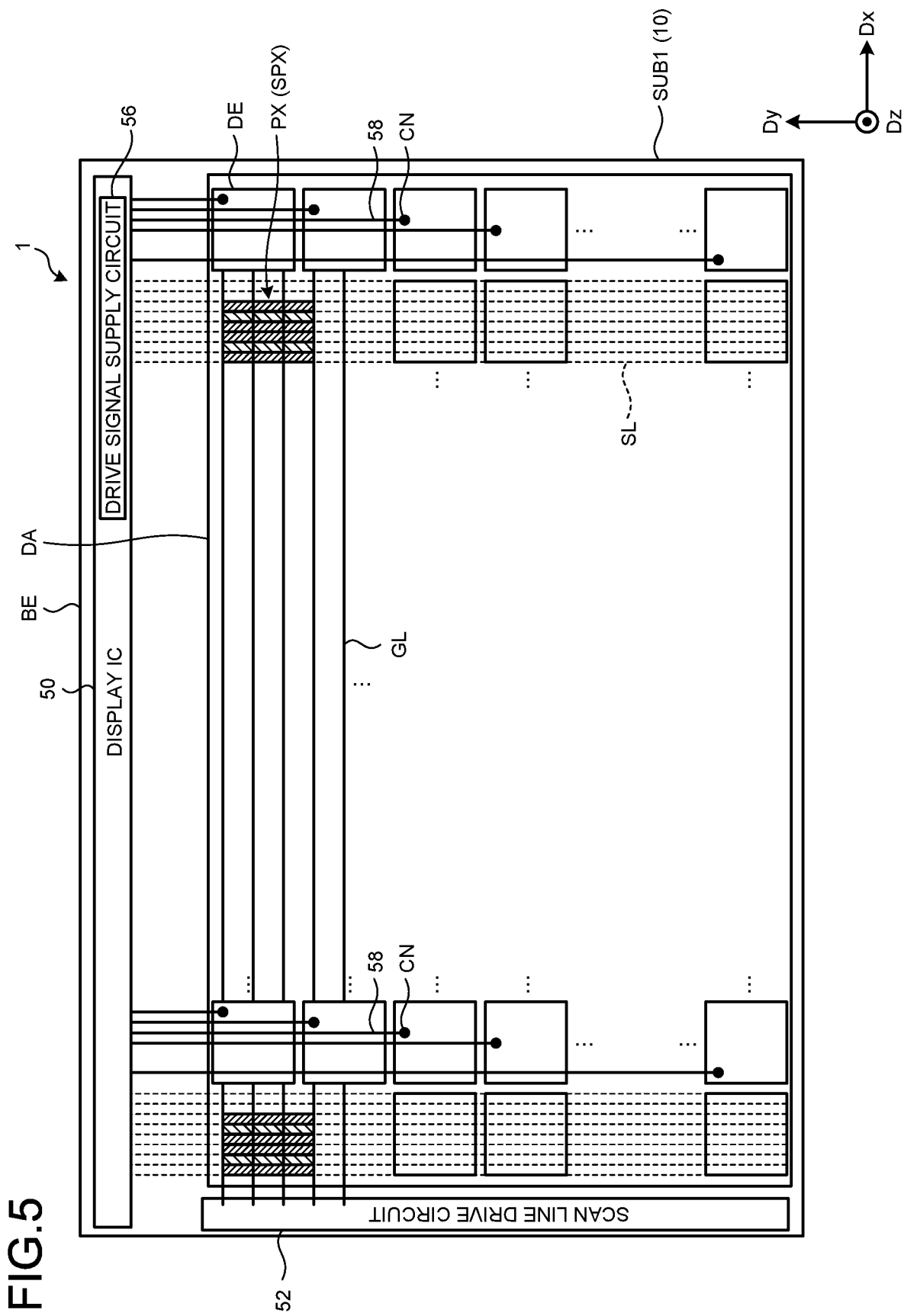
FIG. 5 is a plan view schematically illustrating an array substrate included in the display device.

FIG. 5 is a plan view schematically illustrating the array substrate included in the display device. As illustrated in FIG. 5, the pixels PX (sub pixels SPX) are arrayed in a matrix with a row-column configuration in the display region DA. The detection electrodes DE are arrayed in a matrix with a row-column configuration in the display region DA.

The pixel signal lines SL and the scan lines GL are provided correspondingly to the pixel electrodes PE and the switching elements Tr that the sub pixels SPX have. The pixel signal lines SL are coupled to the control circuit such as the display IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 supplies the scan signal for driving the switching elements Tr of the pixels PX (sub pixels SPX) to the scan lines GL.

Wiring lines 58 are provided so as to correspond to the respective detection electrodes DE and are coupled to the detection electrodes DE through contact holes CN. The wiring lines 58 extend along the second direction Dy and are aligned in the first direction Dx. The wiring lines 58 and the pixel signal lines SL are coupled to the display IC 50 provided in the peripheral region BE.

Although FIG. 5 illustrates only some detection electrodes DE and some pixels PX (sub pixels SPX) in order to make the drawing easy to view, the detection electrodes DE and the pixels PX are arranged on the entire display region DA. That is to say, the pixels PX (sub pixels SPX) and the detection electrodes DE are provided in an overlapping manner. The pixels PX are arranged so as to overlap with one detection electrode DE. One detection electrode DE is arranged so as to overlap with the pixel signal lines SL.

The detection electrodes DE serve as the common electrodes CE in display and the detection electrodes DE for detecting an object to be detected such as a finger Fg and the input support device 3. To be specific, the display IC 50 supplies a display drive signal VCOM to the detection electrodes DE in display. The display IC 50 includes at least a drive signal supply circuit 56. The drive signal supply circuit 56 supplies the display drive signal VCOM or a detection drive signal VD to the detection electrodes DE simultaneously.

To be specific, in touch detection of detecting the position of the finger Fg, the display IC 50 (drive signal supply circuit 56) supplies the detection drive signal VD to the detection electrodes DE, and the detection signals Vdet based on change in self-electrostatic capacitance are output to the display IC 50. The display IC 50 thereby detects contact or proximity of the finger Fg.

In input support device detection of detecting the input support device 3, the display IC 50 (drive signal supply circuit 56) supplies the detection drive signal VD to the detection electrodes DE and detects a position and the like of the input support device 3 using the change in the self-electrostatic capacitances of the detection electrodes DE and resonance of the LC circuit 35 included in the input support device 3.

Figure 6:
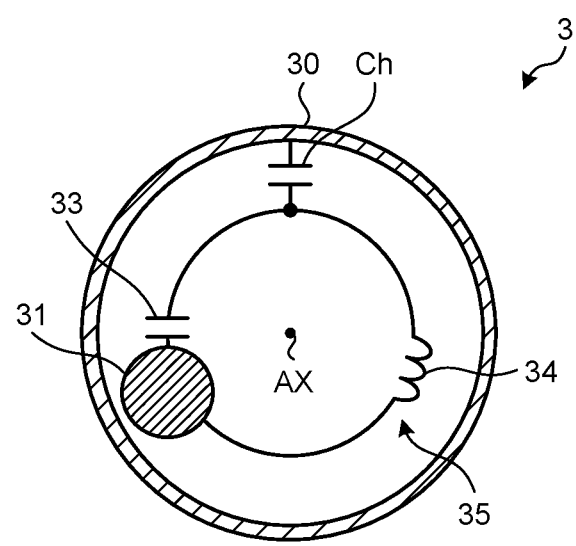
FIG. 6 is a cross-sectional view cut along line VI-VI' in FIG. 2.

Next, a method for detecting the input support device 3 will be described with reference to FIG. 6 to FIG. 10. FIG. 6 is a cross-sectional view cut along line VI-VI' in FIG. 2.

FIG. 6 schematically illustrates the cross-sectional view provided by cutting the input support device 3 along a plane parallel with the upper surface 111a (see FIG. 1). The input support device 3 has a circular shape in a plan view as illustrated in FIG. 6. The first electrode 31 and the capacitor Ch are arranged on the opposite sides with the LC circuit 35 interposed therebetween in a plan view. The first electrode 31 has a circular shape in a plan view. The shape thereof is, however, not limited thereto, and the first electrode 31 may have another shape such as a square shape and a polygonal shape.

FIG. 6 equivalently illustrates the capacitor 33 and the inductor 34 configuring the LC circuit 35, and, for example, the LC circuit 35 may be formed by a chip component mounted on a substrate. It is sufficient that the capacitor 33 and the inductor 34 are coupled electrically in parallel between the first electrode 31 and the capacitor Ch, and arrangement thereof in the housing 30 may be desirably set.

Figure 7:
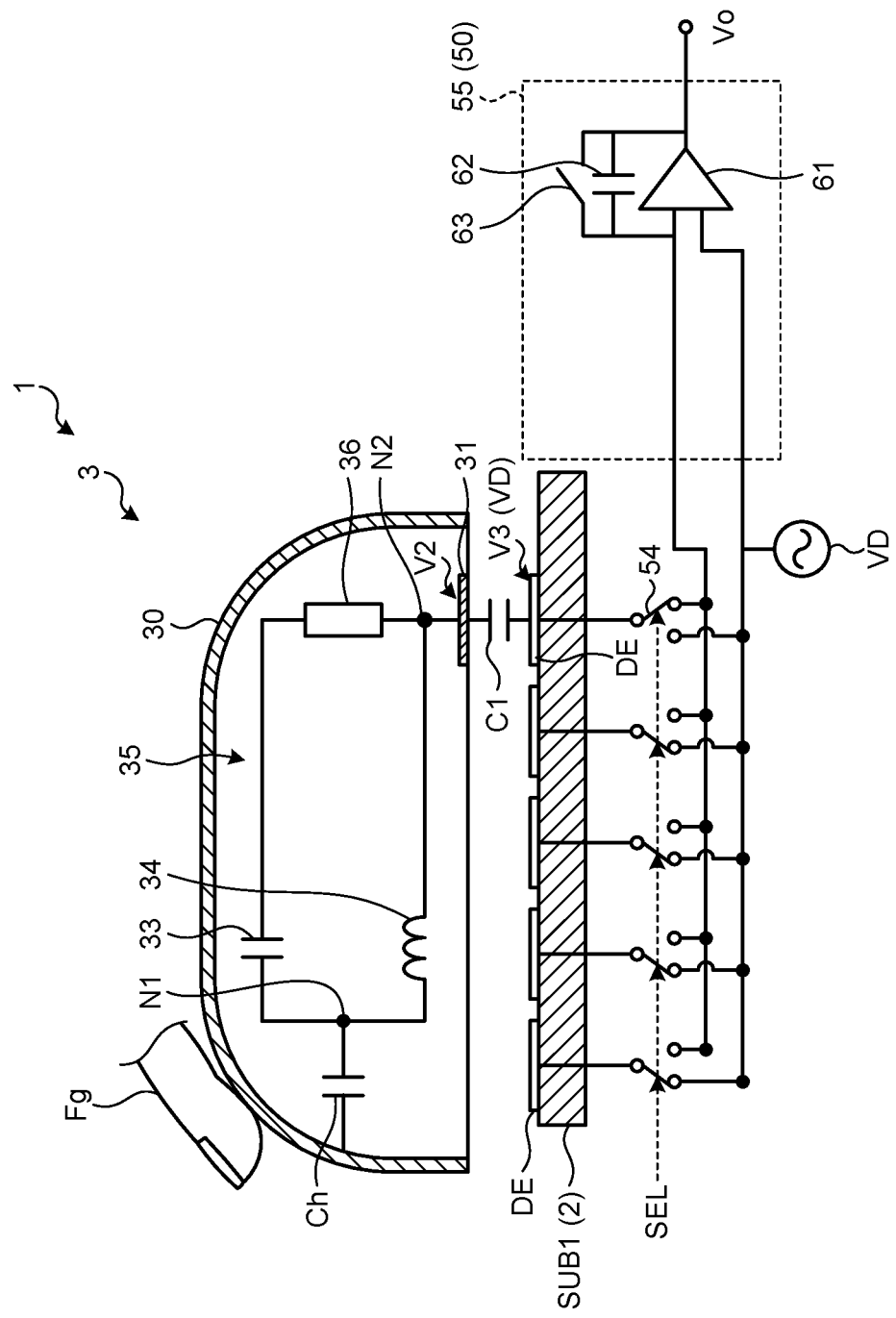
FIG. 7 is a descriptive view for explaining a method for detecting an input support device.
Figure 8:
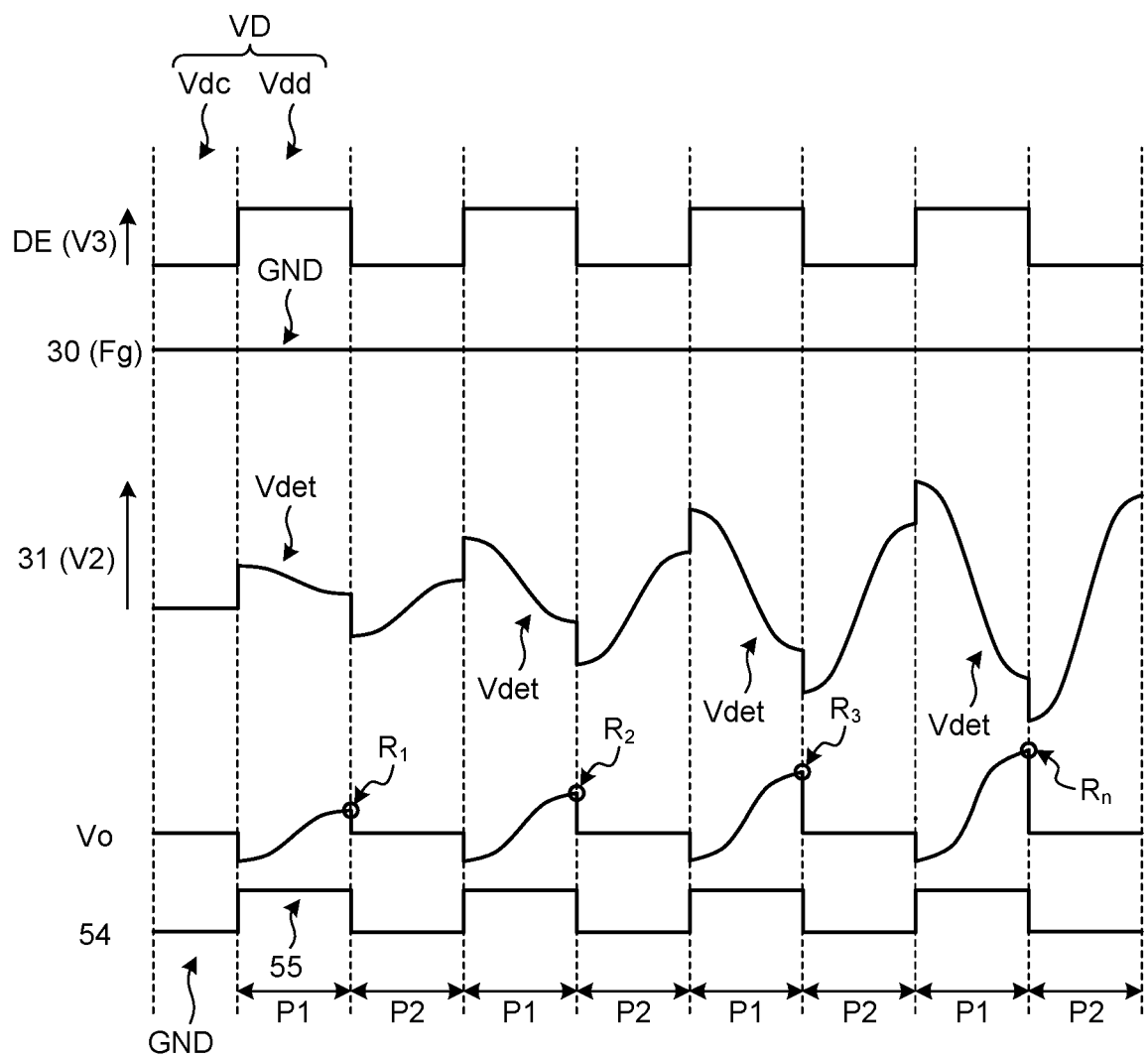
FIG. 8 is a timing waveform chart for explaining the method for detecting the input support device.

FIG. 7 is a descriptive view for explaining a method for detecting the input support device. FIG. 8 is a timing waveform chart for explaining the method for detecting the input support device. As illustrated in FIG. 7, the first electrode 31 of the input support device 3 is arranged so as to face the detection electrode DE of the array substrate SUB1. A capacitance C1 is formed between the first electrode 31 and the detection electrode DE. The drive signal supply circuit 56 supplies the detection drive signal VD having the same potential to each of the detection electrodes with an operation of each switch element 54. The detection electrodes DE to which the detection drive signal VD is supplied include the detection electrode DE overlapping with the first electrode 31 and the detection electrodes DE not overlapping with the first electrode 31.

The coupling portion N1 of the LC circuit 35 on one end side is coupled to the housing 30 through the capacitor Ch. When the operator operates the input support device 3, the finger Fg or the palm thereof comes into contact with the housing 30. The coupling portion N1 of the LC circuit 35 on the one end side is thereby coupled to a reference potential (for example, a reference potential GND) through the capacitor Ch and the housing 30. The reference potential GND is, for example, a ground potential. The reference potential GND is, however, not limited thereto and may be a predetermined fixed potential. When the detection drive signal VD is supplied to the detection electrode DE overlapping with the first electrode 31, potential difference is generated between the coupling portion N1 of the LC circuit 35 on the one end side and the coupling portion N2 of the LC circuit 35 on the other end side and resonance of the LC circuit 35 is generated.

A detection circuit 55 is a signal processing circuit provided in a detection IC 51, and receives the detection signal Vdet (see FIG. 8) output from the detection electrode Rx and performs predetermined signal processing thereon to output an output signal Vo. The detection circuit 55 includes a detection signal amplifier 61, a capacitive element 62, and a reset switch 63. The detection circuit 55 integrates the detection signal Vdet supplied from the detection electrode DE side. As illustrated in FIG. 7, an operational amplifier can be employed as an example of the detection signal amplifier 61. The detection drive signal VD is input to a non-inversion input portion of the detection signal amplifier 61, and the detection electrode DE is coupled to an inversion input terminal thereof. The detection circuit 55 is coupled to each detection electrode DE in a one-to-one correspondence manner by switching of the switch element. Accordingly, as illustrated in FIG. 7, it can be regarded that the detection drive signal VD is supplied through the detection signal amplifier 61 and the switch element 54 to the detection electrode DE coupled to the detection circuit 55 through the switch element 54. The detection circuit 55 can reset a charge of the capacitive element 62 by turning the reset switch 63 ON.

The detection circuit 55 is not limited to the example illustrated in FIG. 7 and may include an A/D conversion circuit (not illustrated) that converts an analog signal output from the detection signal amplifier 61 into a digital signal. In FIG. 7, the LC circuit 35 of the input support device 3 includes a resistor element 36 coupled in series to the capacitor 33. The resistor element 36 may not, however, be provided.

As illustrated in FIG. 7 and FIG. 8, the detection drive signal VD is supplied to the detection electrodes DE that are not coupled to the detection circuit 55. For example, as the detection drive signal VD, a power supply potential Vdd as a high-level potential and a reference potential Vdc as a low-level potential are alternately applied repeatedly at a predetermined frequency. The predetermined frequency is, for example, a resonant frequency of the LC circuit 35. A potential V3 of the detection electrodes DE varies in accordance with the detection drive signal VD. Periods that are repeated in synchronization with the detection drive signal VD are first periods P1 and second periods P2. The first period P1 is a period in which the detection electrodes DE are coupled to the power supply potential Vdd. The second period P2 is a period in which the detection electrodes DE are coupled to the reference potential Vdc. The power supply potential Vdd is higher than the reference potential Vdc, for example.

The detection electrode DE outputs the detection signal Vdet based on the capacitive coupling to the first electrode 31. To be specific, the coupling portion N1 of the LC circuit 35 on the one end side that is coupled to the housing 30 is coupled to the reference potential GND, as described above. When the potential of the detection electrode DE varies, potential difference is thereby generated between the coupling portion N1 and the coupling portion N2. With the potential difference, the resonance is generated in the LC circuit 35, and variation in a potential V2 based on the resonance is output, as the detection signal Vdet, to the detection circuit 55.

Coupling between the detection electrode DE as the detection target and the detection circuit 55 can be switched by controlling ON/OFF of the switch element 54. The switching timing can be adapted to, for example, the above-mentioned first periods P1 and second periods P2. To be more specific, the detection electrode DE and the detection circuit 55 can be coupled to each other in the first period P1, and the coupling state between them can be interrupted in the second period P2. Alternatively, the configuration in which coupling between the detection electrode DE and the detection circuit 55 is interrupted in the first period P1 and the detection electrode DE is coupled to the detection circuit 55 in the second period P2 can also be employed. Furthermore, the configuration in which the coupling state between the detection electrode DE and the detection circuit 55 is kept over the first periods P1 and the second periods P2, which are continuous, and then, the coupling state between the detection electrode DE and the detection circuit 55 is interrupted for a predetermined period can also be employed. After a detection operation in the detection electrode DE is completed by control of the switch element 54 as described above, control of the switch element 54 corresponding to the adjacent detection electrode DE being the next detection target is performed.

The detection drive signal VD has substantially the same frequency as the resonant frequency of the LC circuit 35. Accordingly, the first electrode 31 overlapping with the detection electrode DE is also driven at the resonant frequency, and the resonance of the LC circuit 35 is generated. As the first periods P1 and the second periods P2 are repeated, the amplitude of the detection signal Vdet is increased, so that the potential of the output signal Vo from the detection circuit 55 varies to be increased.

On the other hand, when an object to be detected such as the finger Fg differing from the input support device 3 comes into direct contact with or close to the upper surface 111*a* (see FIG. 1), the detection signal Vdet varies in accordance with change in the self-electrostatic capacitance. That is to say, since no resonance is generated in the case of the finger Fg or the like, variation in the amplitude of the detection signal Vdet over time as illustrated in FIG. 8 does not occur. The input detection system 1 can thus determine whether the object to be detected is the finger Fg or the input support device 3 using the LC resonance of the LC circuit 35.

The capacitor Ch between the housing 30 and the LC circuit 35 is appropriately set in accordance with the resonant frequency of the LC circuit 35, capacitance that is formed between the housing 30 and the finger Fg, or characteristics and a usage condition required for the input support device 3. For example, increase in the capacitance of the capacitor Ch can increase the intensity (amplitude) of the detection signal Vdet. On the other hand, decrease in the capacitance of the capacitor Ch can possibly mitigate variation in the resonant frequency even when the capacitance is formed between the housing 30 and the finger Fg.

Figure 9:
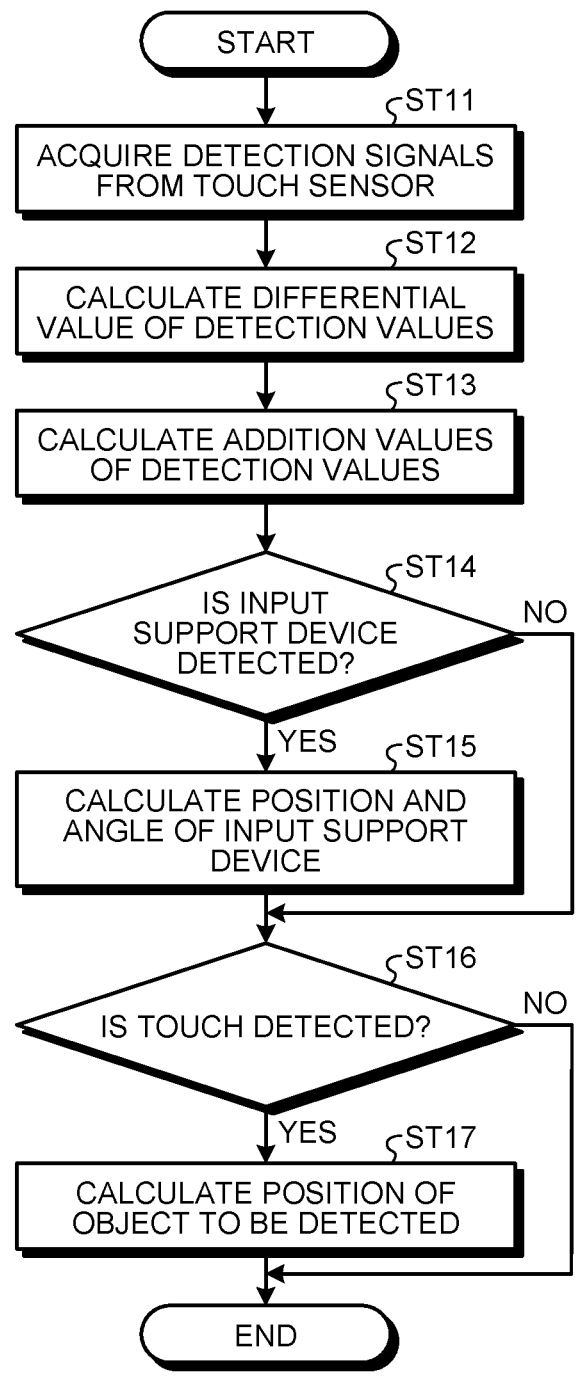
FIG. 9 is a flowchart for explaining a detection method in the input detection system.

FIG. 9 is a flowchart for explaining a detection method in the input detection system. First, the detection circuit 55 acquires the detection signals Vdet from a touch sensor configured by the detection electrodes DE (step ST11). The detection circuit 55 performs signal processing on the detection signals Vdet and outputs the output signals Vo containing a plurality of detection values R ($R_1$, $R_2$, $R_3$, . . . , and $R_n$ (see FIG. 8)) to a calculation circuit (not illustrated) included in the display IC 50. The detection values $R_1$, $R_2$, $R_3$, . . . , and $R_n$ are pieces of data provided by sampling from the analog signal output from the detection signal amplifier 61 at timings in synchronization with the detection drive signal VD.

Then, the calculation circuit calculates a differential value of at least two detection values R based on the output signals Vo received from the detection circuit 55 (step ST12). The calculation circuit may divide the detection values $R_1$, $R_2$, $R_3$, . . . , and $R_n$ into two groups to calculate a difference between the total of one group of the detection values R and the total of the other group of the detection values R, for example.

Subsequently, the calculation circuit calculates addition values of at least two detection values R based on the output signals Vo received from the detection circuit 55 (step ST13). The calculation circuit may calculate the addition value by summing up the detection values $R_1$, $R_2$, $R_3$, . . . , and $R_n$, for example.

The calculation circuit determines whether the input support device 3 is detected (step ST14). To be specific, the calculation circuit compares the differential values acquired at step ST12 and a first detection reference value previously stored in a storage circuit. When any of the differential values is equal to or larger than the first detection reference value, that is, when the input support device 3 is detected (Yes at step ST14), the calculation circuit calculates the position of the input support device 3 and the angle (rotation operation RT) of the input support device 3 (step ST15).

When the differential values are smaller than the first detection reference value, that is, when the input support device 3 is not detected (No at step ST14), the calculation circuit omits calculation of information related to the input support device 3.

Then, the calculation circuit determines whether touch of the object to be detected such as the finger Fg is detected (step ST16). To be specific, the calculation circuit compares the addition values acquired at step ST13 and a second detection reference value previously stored in the storage circuit. When any of the addition values is equal to or larger than the second detection reference value, that is, when touch of the object to be detected such as the finger Fg is detected (Yes at step ST16), the calculation circuit calculates the position of the object to be detected such as the finger Fg (step ST17).

When the addition values are smaller than the second detection reference value, that is, when touch of the object to be detected such as the finger Fg is not detected (No at step ST16), the calculation circuit omits calculation of the position of the object to be detected such as the finger Fg. The calculation circuit outputs calculation results (information related to the input support device 3 and touch detection information of the finger Fg or the like) to an external host IC and finishes detection for one frame.

The detection method illustrated in FIG. 9 is merely an example and can be appropriately modified. For example, the display IC 50 may perform the detection of the input support device 3 (steps ST12, ST14, and ST15) and the touch detection of the finger Fg or the like (steps ST13, ST16, and ST17) simultaneously.

Figure 10:
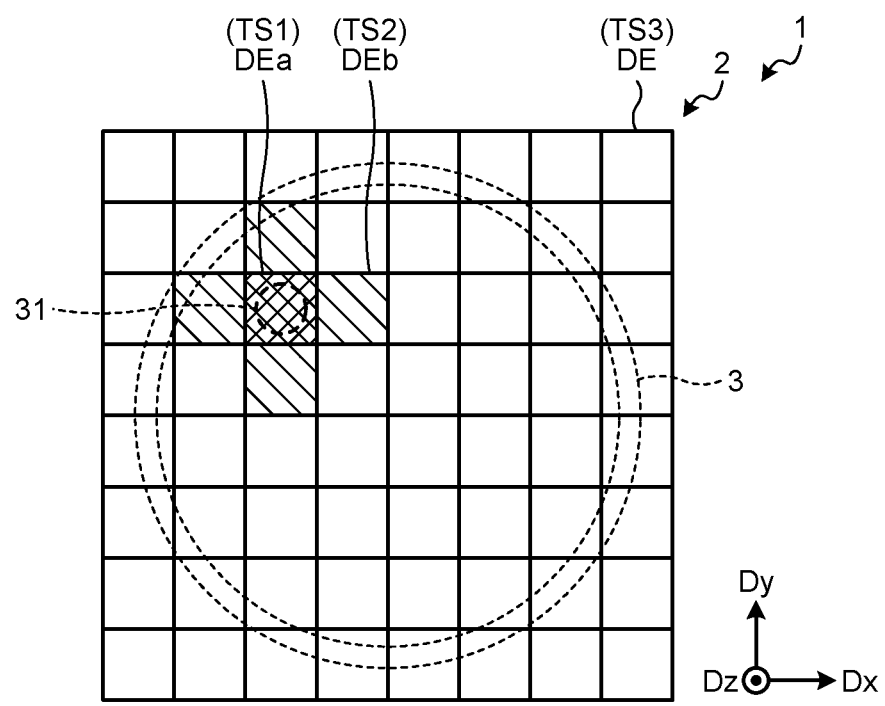
FIG. 10 is a plan view schematically illustrating the input support device and a plurality of detection electrodes.

FIG. 10 is a plan view schematically illustrating the input support device and the detection electrodes. In FIG. 10, the input support device 3 and the first electrode 31 are indicated by dotted circles for making the drawing easy to view. FIG. 10 illustrates the detection electrodes DE by hatching in accordance with signal intensities TS1, TS2, and TS3 (amplitudes) of the output signals Vo output from the detection electrodes DE. The signal intensities TS1, TS2, and TS3 may be differential values of the above-mentioned detection values R. In FIG. 10, one square corresponds to one detection electrode DE.

As illustrated in FIG. 10, the output signal Vo of the signal intensity TS1 is output from a detection electrode DEa overlapping with the first electrode 31. In the embodiment, since the detection drive signal VD is supplied to the detection electrodes DE, the output signals Vo of the signal intensity TS2 are output from detection electrodes DEb adjacent to the detection electrode DEa in accordance with the capacitance that is formed between the detection electrodes DEb and the first electrode 31. The output signals Vo of the signal intensity TS3 are output from the detection electrodes DE at positions away from the detection electrode DEa. The signal intensities TS1, TS2, and TS3 satisfy a relation of TS3<TS2<TS1.

The display IC may determine whether the object to be detected is the input support device 3 or the finger Fg by comparing detection patterns provided from the signal intensities TS1 and TS2 of the detection electrodes DEa and DEb with previously stored detection patterns. The detection pattern may be an arrangement pattern of the detection electrodes DE, a signal intensity distribution, or the like corresponding to the object to be detected such as the finger Fg and the input support device 3.

Although FIG. 10 illustrates the three signal intensities TS1, TS2, and TS3 in a distinguished manner in order to facilitate explanation, the display IC 50 may distinguish the signal intensity into equal to or more than four signal intensities. Although the first electrode 31 overlaps with one detection electrode DE, it is not limited thereto and one first electrode 31 may overlap over the detection electrodes DE. The detection pattern illustrated in FIG. 10 is merely an example. Although the detection electrodes DEb are four detection electrodes DE adjacent to the detection electrode DEa in the first direction Dx and the second direction Dy, the detection electrodes DEb are not limited thereto. A detection pattern in which the output signals Vo of the signal intensity TS2 are output from equal to or more than five detection electrodes DEb adjacent to the detection electrode DEa may be employed.

First Modification

Figure 11:
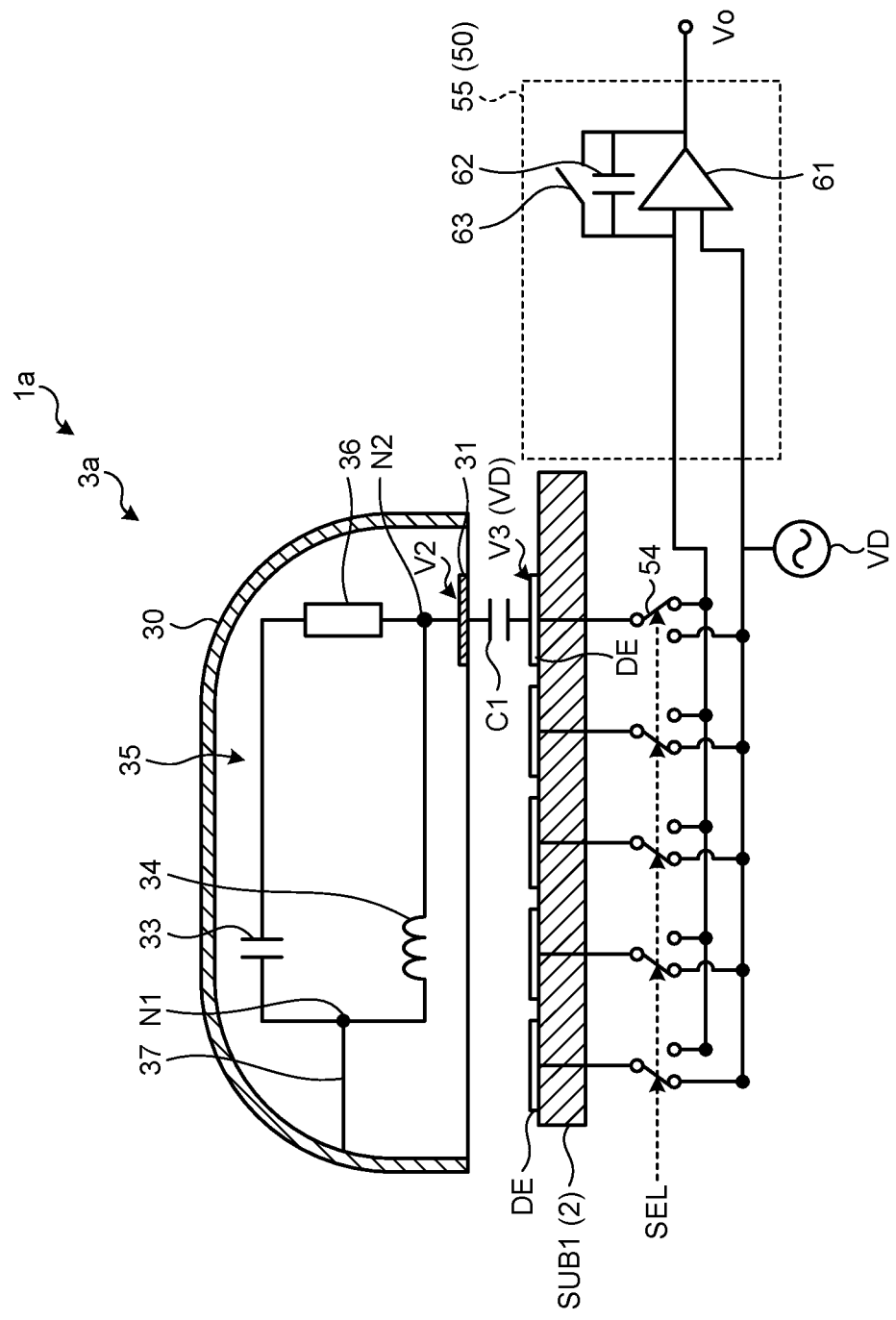
FIG. 11 is a descriptive view for explaining the configuration of an input support device in a first modification.

FIG. 11 is a descriptive view for explaining the configuration of an input support device in a first modification. In the following explanation, the same reference numerals denote the same components described in the above-mentioned embodiment and overlapped explanation thereof is omitted.

As illustrated in FIG. 11, an input detection system 1a in the first modification is different from that in the above-mentioned first embodiment in the configuration in which an input support device 3a includes no capacitor Ch. That is to say, the coupling portion N1 of the LC circuit 35 on the one end side is coupled to the housing 30 not through the capacitor Ch but through a coupling member 37. The coupling member 37 is, for example wiring formed by a conductor. Any shape and configuration of the coupling member 37 may be employed as long as the coupling member 37 can electrically couple the coupling portion N1 and the housing 30.

In the first modification, the input support device 3a includes no capacitor Ch, so that potential variation of the first electrode 31 by resonance is increased, thereby increasing the intensity of the detection signal.

Second Modification

Figure 12:
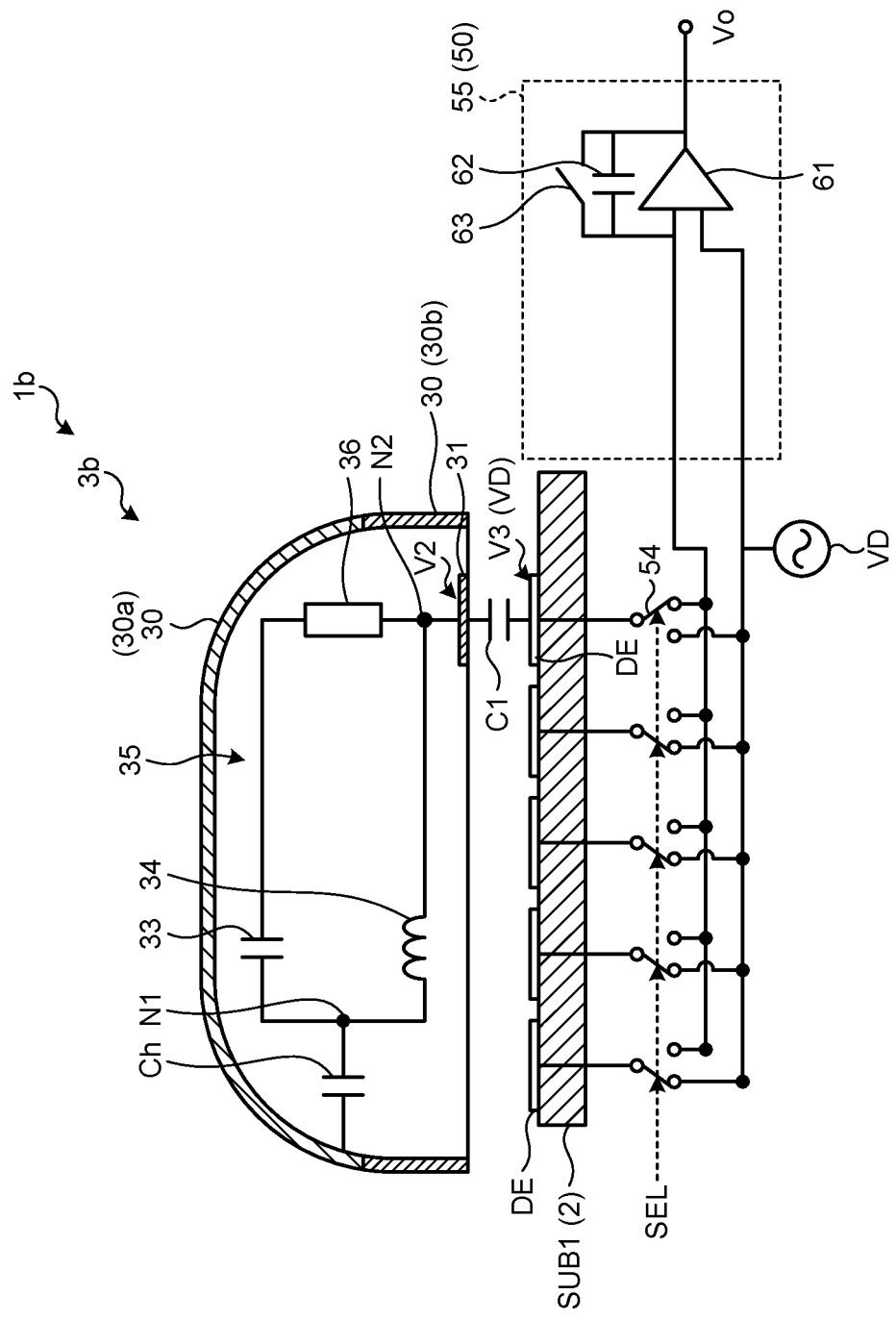
FIG. 12 is a descriptive view for explaining the configuration of an input support device in a second modification.

FIG. 12 is a descriptive view for explaining the configuration of an input support device in a second modification. As illustrated in FIG. 12, an input detection system 1b in the second modification is different from that in the above-mentioned first embodiment in the configuration in which the housing 30 of an input support device 3b includes a first housing 30a and a second housing 30b.

The first housing 30a is formed by a conductor and is located in an upper portion of the housing 30. The first housing 30a is formed to have a projecting shape and has an opening formed on the array substrate SUB1 side. The coupling portion N1 of the LC circuit 35 on the one end side is coupled to the first housing 30a through the capacitor Ch.

The second housing 30b is formed by a non-conductor made of a resin material, for example, and is located in a lower portion of the housing 30. The second housing 30b is coupled to the first housing 30a and is located between the detection electrodes DE provided in the detection region and the first housing 30a. To be more specific, the second housing 30b is an annular member and is coupled to the lower end (opening end portion on the array substrate SUB1 side) of the first housing 30a.

In the second modification, the first housing 30a formed by the conductor is provided in a portion with which the finger Fg or the like comes into contact when the input support device 3b is operated. The coupling portion N1 of the LC circuit 35 on the one end side is thereby coupled to the reference potential GND through the capacitor Ch and the first housing 30a. The second housing 30b formed by the non-conductor is provided between the first housing 30a and the detection electrodes DE. With this configuration, a distance between the first housing 30a and the detection electrodes DE can be increased to reduce the capacitance that is formed between the housing 30 and the detection electrodes DE in comparison with the above-mentioned first embodiment. As a result, the second modification can prevent error detection of the input support device 3b.

The input support device 3b in the second modification can be combined with the configuration of the input support device 3a in the first modification. That is to say, the coupling member 37 may be provided instead of the capacitor Ch in the input support device 3b.

In the first embodiment, the first modification, and the second modification, each of the input support devices 3, 3a, and 3b includes one first electrode 31. Even in this case, the position of the input support device 3, 3a, or 3b can be specified by setting the area (diameter) of the first electrode 31 to be substantially the same as the area (diameter) of the housing 30 as in a pen-type or slider-type input support device 3B or 3D in a sixth modification or a seventh modification, which will be described later. Alternatively, the position of the input support device 3, 3a, or 3b can be specified by causing the position of the first electrode 31 to match with the rotating axis AX of the housing 30. When an operation is performed in a state where the position of the input support device 3, 3a, or 3b is fixed, the angle (rotation operation RT) of the input support device 3, 3a, or 3b can be detected by detecting variation in the detection pattern over time. The configuration of the input support device 3, 3a, or 3b can be appropriately modified in accordance with a required input operation or usage condition.

As described above, the input detection system 1 includes the electrodes (detection electrodes DE) arrayed in the detection region (display region DA), and the input support device 3 including the LC circuit 35, the first electrode 31 coupled to the LC circuit 35 and arranged so as to overlap with at least equal to or more than one of the electrodes (detection electrodes DE), and the housing 30 accommodating therein at least the LC circuit 35. The housing 30 is the conductor, and the one end side (coupling portion N1) of the LC circuit 35 is coupled to the housing 30 through the coupling member 37 or the capacitor Ch and the other end side (coupling portion N2) of the LC circuit 35 is coupled to the first electrode 31.

With this configuration, the one end side (coupling portion N1) of the LC circuit 35 is coupled to the reference potential GND through the housing 30 and the other end side (coupling portion N2) of the LC circuit 35 receives supply of a potential in accordance with the detection drive signal VD through the first electrode 31 and the detection electrode DE in self-electrostatic capacitance-type (self-type) driving in which the detection drive signal VD having the same potential is supplied to the detection electrodes DE. Accordingly, the input detection system 1 can generate resonance of the LC circuit 35 using the potential difference between the housing 30 and the first electrode 31 and can detect the input support device 3 using the resonance of the LC circuit 35. That is to say, the input detection system 1 can detect the input support device 3 by the same driving system as that for the touch detection of detecting the object to be detected such as the finger Fg.

Second Embodiment

Figure 13:
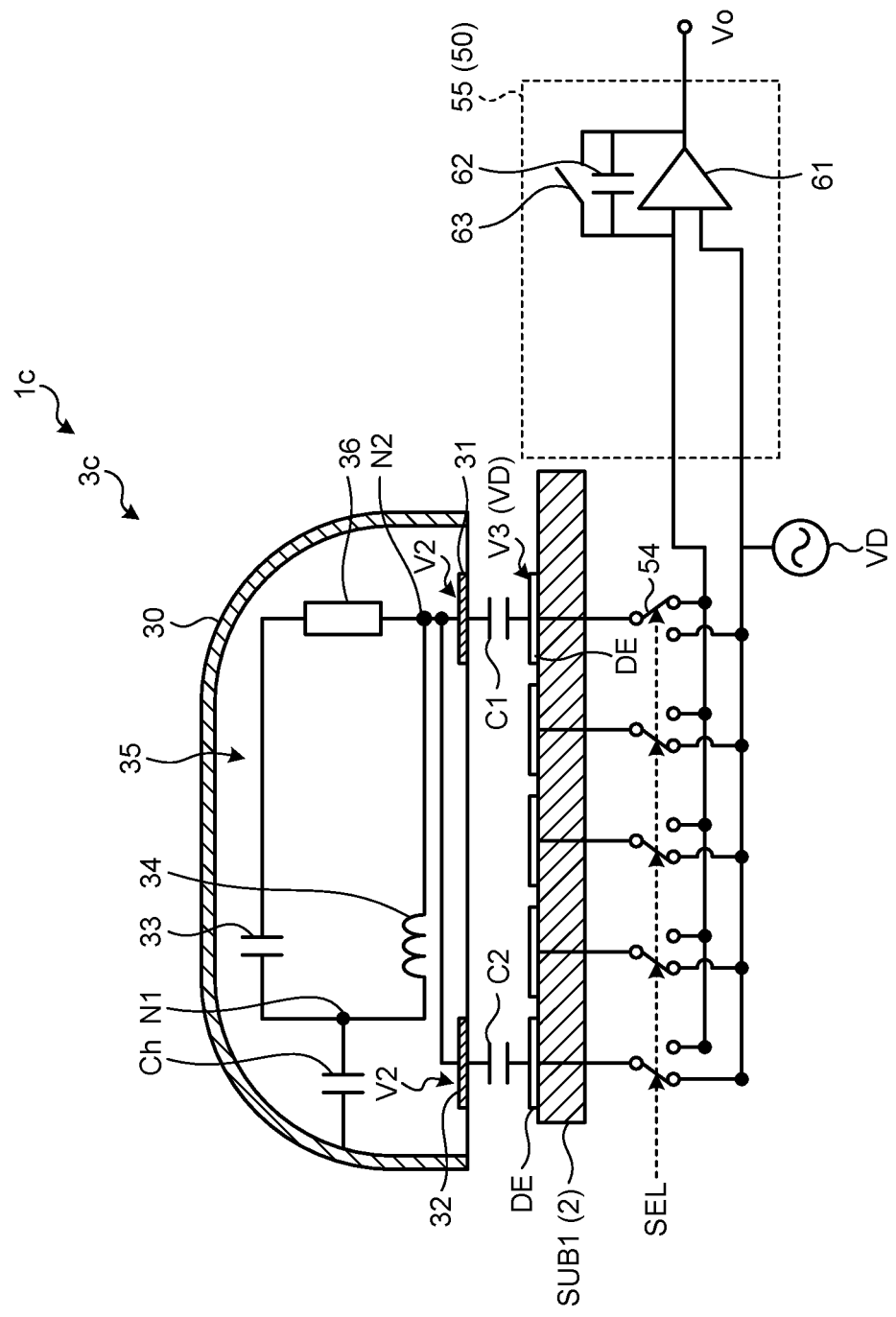
FIG. 13 is a descriptive view for explaining the configuration of an input support device according to a second embodiment.

FIG. 13 is a descriptive view for explaining the configuration of an input support device according to a second embodiment. As illustrated in FIG. 13, an input detection system 1c in the second embodiment is different from that in the above-mentioned first embodiment in the configuration in which an input support device 3c includes a second electrode 32 in addition to the first electrode 31.

The first electrode 31 and the second electrode 32 are coupled in parallel to the coupling portion N2 of the LC circuit 35 on the other end side. The second electrode 32 is arranged so as to be separated from the first electrode 31 and faces the detection electrode DE differing from that facing the first electrode 31. A capacitance C2 is formed between the second electrode 32 and the detection electrode DE.

In the embodiment, the drive signal supply circuit 56 (see FIG. 5) supplies the detection drive signal VD having the same potential to the detection electrode DE facing the first electrode 31 and the detection electrode DE facing the second electrode 32. Accordingly, the second electrode 32 is driven at the resonant frequency similarly to the first electrode 31, and resonance of the LC circuit 35 is generated. The potential of the second electrode 32 has a waveform similar to a waveform of the potential V2 of the first electrode 31 illustrated in FIG. 8.

FIG. 14 is a plan view schematically illustrating the input support device and the detection electrodes in the second embodiment. As illustrated in FIG. 14, the second electrode 32 has the same shape and area as those of the first electrode 31. Each of the first electrode 31 and the second electrode 32 overlaps with one detection electrode DE. That is to say, the capacitance C2 (see FIG. 13) that is formed between the second electrode 32 and the detection electrode DE is equal to the capacitance C1 (see FIG. 13) that is formed between the first electrode 31 and the detection electrode DE.

The output signal Vo of the signal intensity TS1 is output from the detection electrode DEa overlapping with the first electrode 31. The output signals Vo of the signal intensity TS2 are output from the detection electrodes DEb adjacent to the detection electrode DEa. In the embodiment, since the detection drive signal VD is supplied to the detection electrodes DE, the output signal Vo of the signal intensity TS1 is output from a detection electrode DEc overlapping with the second electrode 32. The output signals Vo of the signal intensity TS2 are output from detection electrodes DEd adjacent to the detection electrode DEc.

The display IC 50 can detect the position of the input support device 3c based on the detection patterns provided from the signal intensities TS1 and TS2 of the detection electrodes DEa, DEb, DEc, and DEd. In the embodiment, the detection pattern of the signal intensities TS1 and TS2 of the detection electrodes DEa and DEb overlapping with the first electrode 31 and the detection pattern of the signal intensities TS1 and TS2 of the detection electrodes DEc and DEd overlapping with the second electrode 32 have equal shapes and signal intensity distributions. Accordingly, the position of the input support device 3c can be specified but it is difficult to specify the positions of the first electrode 31 and the second electrode 32 from the detection pattern illustrated in FIG. 14. Even in this case, a relative angle (rotation operation RT) of the input support device 3c can be detected based on variation in the detection pattern over time, for example.

Third Modification

FIG. 15 is a plan view schematically illustrating an input support device and a plurality of detection electrodes in a third modification. As illustrated in FIG. 15, an input detection system 1d in the third modification is different from that in the above-mentioned second embodiment in a point that shapes and areas of the first electrode 31 and the second electrode 32 of an input support device 3d in a plan view are different from each other. In other words, the number of detection electrodes DEa overlapping with the first electrode 31 is different from the number of detection electrodes DEc overlapping with the second electrode. The first electrode 31 and the second electrode 32 in the third modification are coupled in parallel to the coupling portion N2 of the LC circuit 35 on the other end side, similarly to the above-mentioned second embodiment.

To be specific, the first electrode 31 has a circular shape in a plan view and is arranged so as to overlap with one detection electrode DEa. The second electrode 32 has an L shape having a larger area than that of the first electrode 31 in a plan view and is arranged so as to overlap with five detection electrodes DEc.

Furthermore, the number of detection electrodes DEb from which the signal intensity TS2 is provided, the detection electrodes DEb being around the detection electrode DEa overlapping with the first electrode 31, and the number of detection electrodes DEd from which the signal intensity TS2 is provided, the detection electrodes DEd being around the detection electrodes DEc overlapping with the second electrode 32 are also different from each other. For example, the number of detection electrodes DEb around the detection electrode DEa is four, and the number of detection electrodes DEd around the detection electrodes DEc is 11.

The display IC 50 can specify the positions of the first electrode 31 and the second electrode 32 based on these detection patterns. That is to say, the position and the rotation angle (rotation operation RT) of the input support device 3d can be detected in the third modification.

The first electrode 31 and the second electrode 32 may have an inverse area size relation in a plan view. The shapes of the first electrode 31 and the second electrode 32 are merely examples, and desired planar shapes of the first electrode 31 and the second electrode 32 may be employed as long as they can provide different detection patterns.

Fourth Modification

FIG. 16 is a plan view schematically illustrating an input support device and a plurality of detection electrodes in a fourth modification. As illustrated in FIG. 16, an input detection system 1e in the fourth modification is different from that in the above-mentioned third modification in a point that the area of the second electrode 32 of an input support device 3e is smaller.

To be specific, the first electrode 31 and the second electrode 32 have circular shapes in a plan view. The first electrode 31 overlaps with one detection electrode DEa. The second electrode 32 has a smaller area and a smaller diameter than those of the first electrode 31 in a plan view and is arranged so as to overlap with one detection electrode DEc.

The capacitance C2 that is formed between the second electrode 32 and the detection electrode DEc is smaller than the capacitance C1 that is formed between the first electrode 31 and the detection electrode DEa. A signal intensity TS4 that is output from the detection electrode DEc overlapping with the second electrode 32 is lower than the signal intensity TS1 that is output from the detection electrode DEa overlapping with the first electrode 31. The signal intensity TS3 is output from the detection electrodes DE around the detection electrode DEc. The signal intensity TS1 to the signal intensity TS4 satisfy a relation of TS3<TS2<TS4<TS1, for example.

In the fourth modification, even when the first electrode 31 and the second electrode 32 respectively overlap with one detection electrode DEa and one detection electrode DEc, the detection pattern that is provided from the detection electrode DEa overlapping with the first electrode 31 and the adjacent detection electrodes DEb and the detection pattern that is provided from the detection electrode DEc overlapping with the second electrode 32 are different from each other. Accordingly, the input detection system 1e can detect the position and the rotation angle (rotation operation RT) of the input support device 3e while preventing increase in the capacitances C1 and C2 that are formed between the first electrode 31 and the second electrode 32 and the detection electrodes DE. In the fourth modification, the increase in the capacitances C1 and C2 can be prevented, so that lowering of detection sensitivity can be possibly prevented.

Fifth Modification

FIG. 17 is a plan view schematically illustrating an input support device and a plurality of detection electrodes in a fifth modification. As illustrated in FIG. 17, an input detection system 1f in the fifth modification is different from those in the above-mentioned third modification and fourth modification illustrated in FIG. 15 in the shape and area of the second electrode 32 of an input support device 3f in a plan view.

The second electrode 32 has an oval or elliptic shape having a larger area than that of the first electrode 31 in a plan view and is arranged so as to overlap with two detection electrodes DEc. The number of detection electrodes DEd from which the signal intensity TS2 is provided is six, the detection electrodes DEd being around the detection electrodes DEc overlapping with the second electrode 32.

In the fifth modification, the area of the second electrode 32 is smaller than that in the above-mentioned third modification, thereby preventing increase in the capacitances C1 and C2. The display IC 50 can specify the positions of the first electrode 31 and the second electrode 32 based on the detection patterns provided from the detection electrodes DEa and DEb and the detection patterns provided from the detection electrodes DEc and DEd as illustrated in FIG. 17.

Third Embodiment

Figure 18:
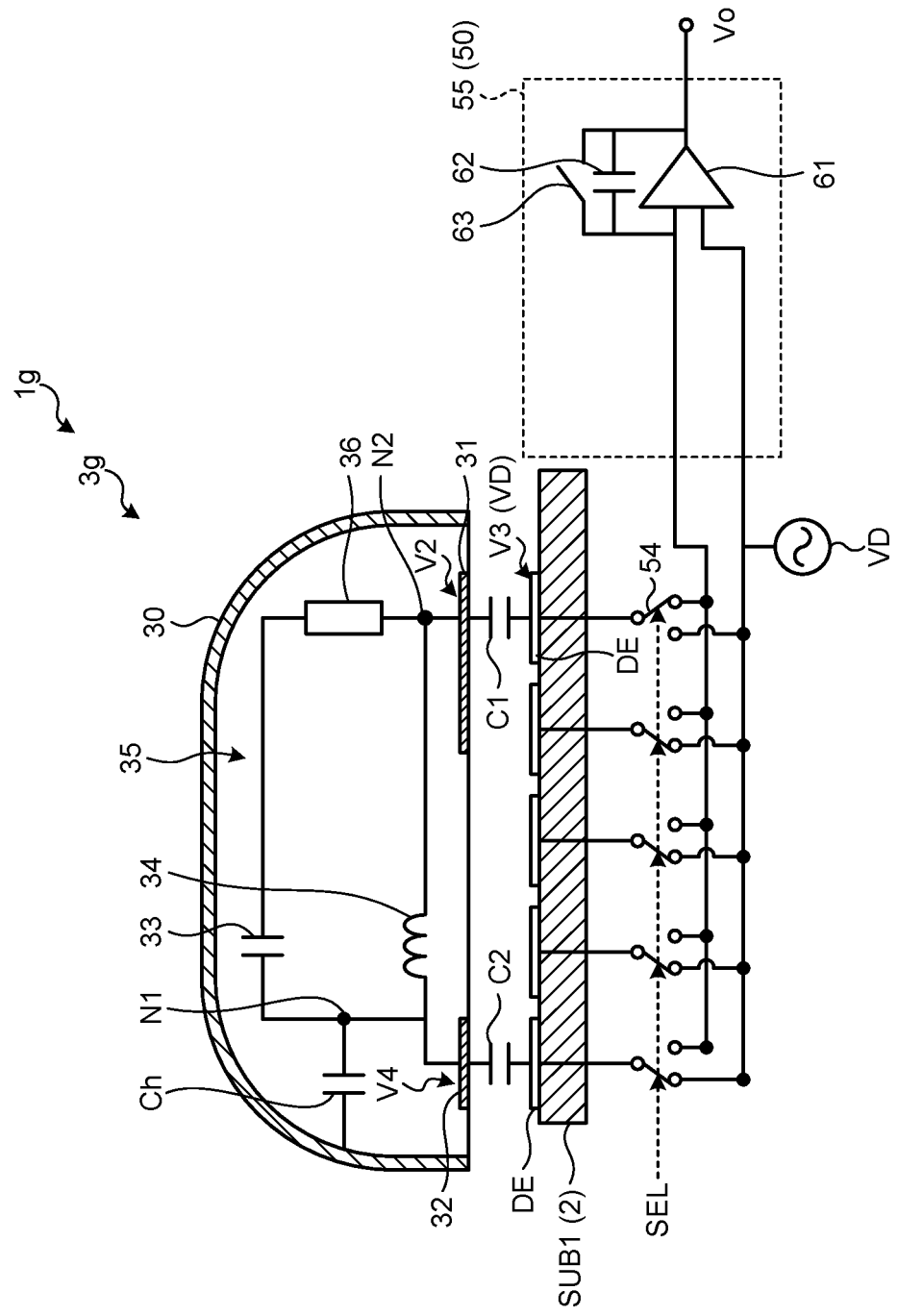
FIG. 18 is a descriptive view for explaining the configuration of an input support device according to a third embodiment.

FIG. 18 is a descriptive view for explaining the configuration of an input support device according to a third embodiment. As illustrated in FIG. 18, an input detection system 1g in the third embodiment is different from that in the above-mentioned second embodiment in a coupling configuration between the second electrode 32 and the LC circuit 35 in an input support device 3g.

That is to say, the first electrode 31 is coupled to the coupling portion N2 of the LC circuit 35 on the other end side, and the second electrode 32 is coupled to the coupling portion N1 of the LC circuit 35 on the one end side. That is to say, the coupling portion N1 of the LC circuit 35 on the one end side is coupled to the housing 30 through the capacitor Ch and is coupled in parallel to the second electrode 32. The first electrode 31 and the second electrode 32 are arranged so as to overlap with different detection electrodes DE also in the embodiment.

Figure 19:
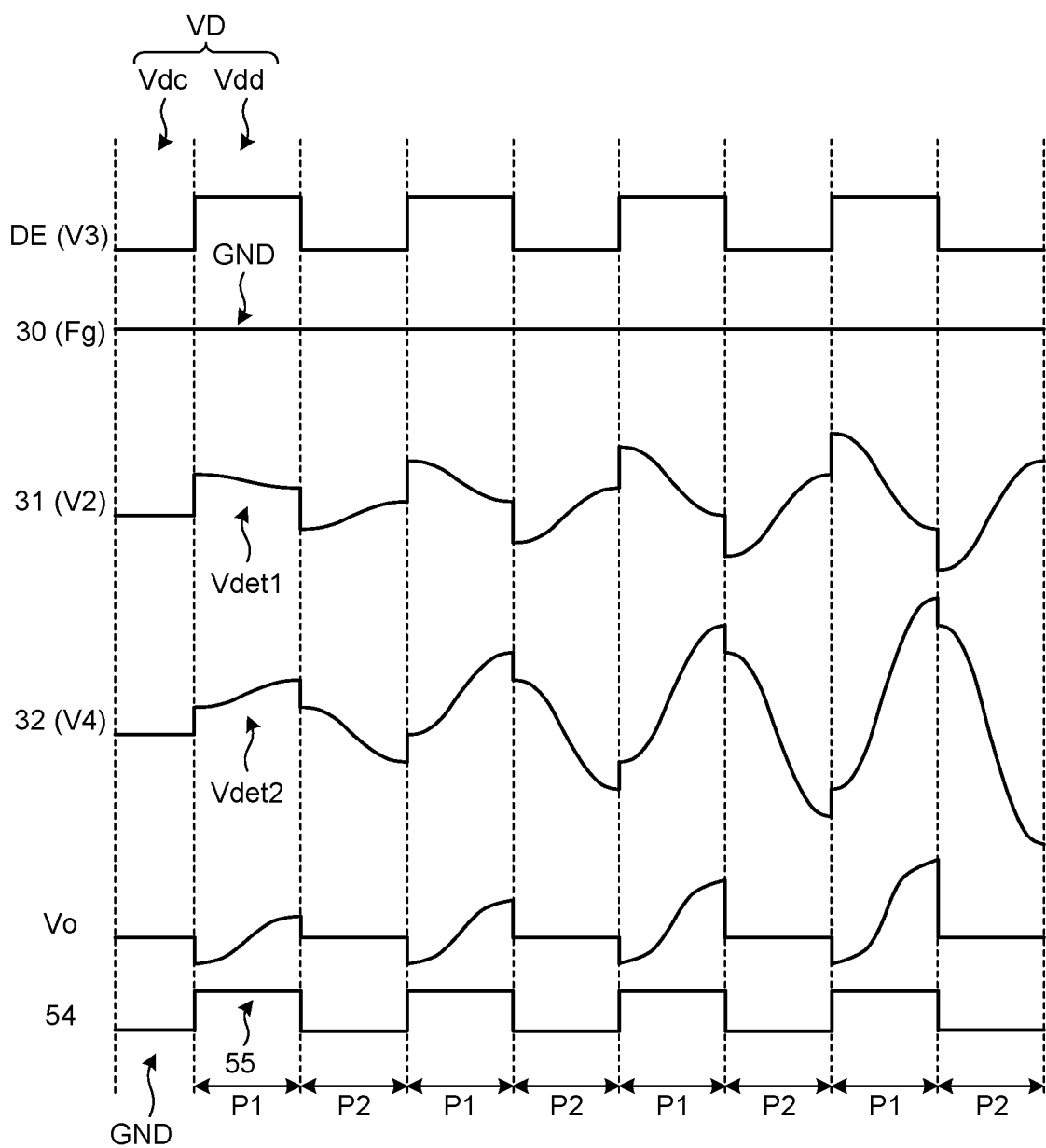
FIG. 19 is a timing waveform chart for explaining a method for detecting the input support device in the third embodiment.

FIG. 19 is a timing waveform chart for explaining a method for detecting the input support device in the third embodiment. As illustrated in FIG. 19, the potential V2 of the first electrode 31 has a similar waveform to that in the above-mentioned first embodiment. A potential V4 of the second electrode 32 has a tendency reversed from the potential V2 of the first electrode 31. That is to say, the potential V2 of the first electrode 31 tends to be decreased and the potential V4 of the second electrode 32 tends to be increased in each first period P1. The potential V2 of the first electrode 31 tends to be increased and the potential V4 of the second electrode 32 tends to be decreased in each second period P2.

Accordingly, the output signal Vo based on a first detection signal Vdet1 output from the detection electrode DE overlapping with the first electrode 31 and the output signal Vo based on a second detection signal Vdet2 output from the detection electrode DE overlapping with the second electrode 32 have different polarities.

Figure 20:
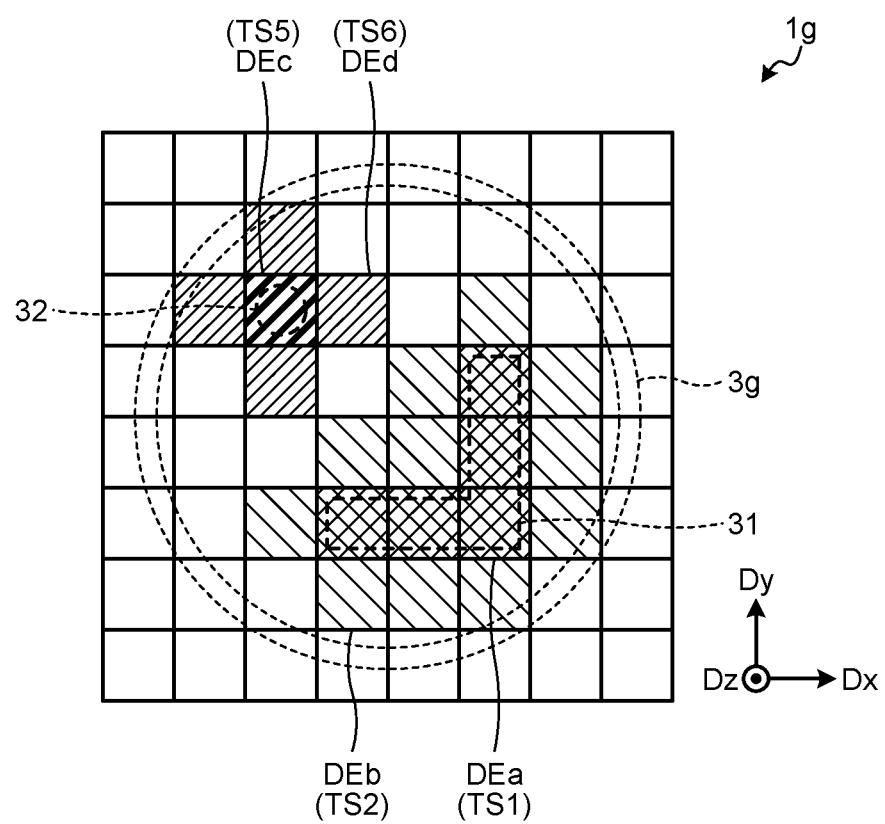
FIG. 20 is a plan view schematically illustrating the input support device and a plurality of detection electrodes in the third embodiment.

FIG. 20 is a plan view schematically illustrating the input support device and the detection electrodes in the third embodiment. The first electrode 31 has an L shape in a plan view as illustrated in FIG. 20. The second electrode 32 has a circular shape in a plan view and has a smaller area than that of the first electrode 31.

The output signal Vo of a signal intensity TS5 is output from the detection electrode DEc overlapping with the second electrode 32. The output signals Vo of a signal intensity TS6 are output from the detection electrodes DEd adjacent to the detection electrode DEc. The signal intensities TS5 and TS6 have polarities opposite to those of the signal intensities TS1 and TS2 from the detection electrodes DEa overlapping with the first electrode 31 and the adjacent detection electrodes DEb. When the signal intensities TS1 and TS2 have the positive polarity, for example, the signal intensities TS5 and TS6 have the negative polarity. In this case, the signal intensities satisfy a relation of TS5<TS6<TS3<TS2<TS1.

The display IC 50 can detect the position of the input support device 3g and the positions of the first electrode 31 and the second electrode 32 based on the detection patterns provided from the signal intensities TS1 and TS2 and the signal intensities TS5 and TS6 having the different polarities.

The first electrode 31 and the second electrode 32 have different shapes and areas in FIG. 20. The shapes and areas thereof are, however, not limited thereto, and the first electrode 31 and the second electrode 32 may have the same shape and area. Even in this case, the display IC 50 can detect the first electrode 31 and the second electrode 32 based on the signal intensities TS1 and TS2 and the signal intensities TS5 and TS6 having the different polarities.

The configurations of the first electrode 31 and the second electrode 32 in the above-mentioned second embodiment, third modification, fourth modification, or fifth modification can be applied to those in the third embodiment. The third embodiment may be combined with the configurations in the above-mentioned first modification or second modification.

Fourth Embodiment

Figure 21:
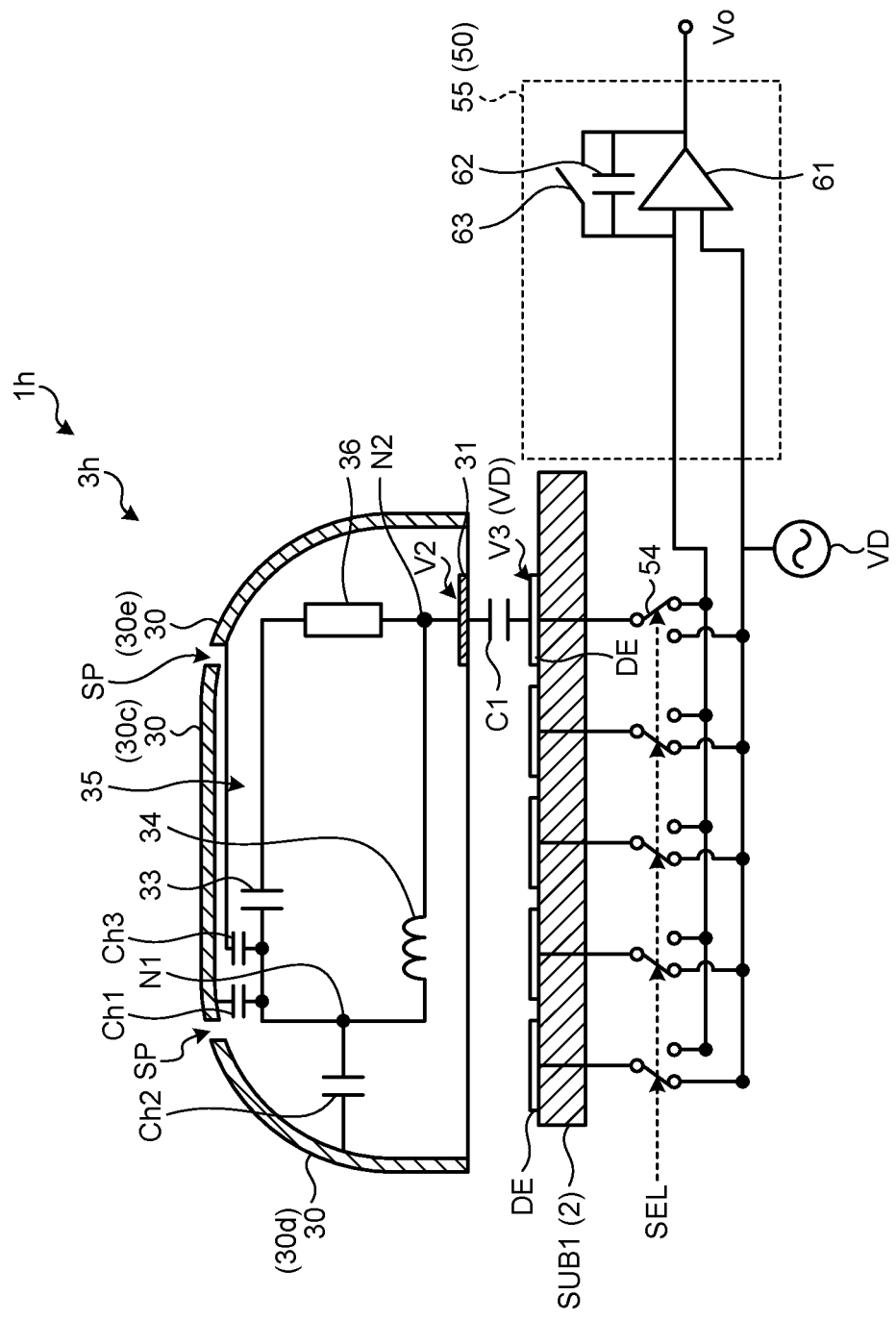
FIG. 21 is a descriptive view for explaining the configuration of an input support device according to a fourth embodiment.

FIG. 21 is a descriptive view for explaining the configuration of an input support device according to a fourth embodiment. As illustrated in FIG. 18, an input detection system 1h in the fourth embodiment is different from that in the above-mentioned first embodiment to third embodiment in the configuration in which the housing 30 is provided while being separated into a plurality of portions.

To be specific, the housing 30 includes a first partial housing 30c, a second partial housing 30d, and a third partial housing 30e that are separately provided. Slits SP are provided between the first partial housing 30c and the second partial housing 30d and between the first partial housing 30c and the third partial housing 30e. The first partial housing 30c is the upper surface (top plate) of the housing 30. The second partial housing 30d and the third partial housing 30e are the side surfaces (side plates) of the housing 30 and are provided around the first partial housing 30c. All of the first partial housing 30c, the second partial housing 30d, and the third partial housing 30e are formed by conductors, and they are insulated from each other.

The coupling portion N1 of the LC circuit 35 on the one end side is coupled to the first partial housing 30c through a first capacitor Ch1, is coupled to the second partial housing 30d through a second capacitor Ch2, and is coupled to the third partial housing 30e through a third capacitor Ch3. The first capacitor Ch1, the second capacitor Ch2, and the third capacitor Ch3 have different capacitance values.

In the embodiment, a capacitance that is formed between a part of the housing 30 coupled to the reference potential GND and the coupling portion N1 of the LC circuit 35 on the one end side becomes different depending on positions (the first partial housing 30c, the second partial housing 30d, and the third partial housing 30e) at which the finger Fg comes into contact with the housing 30. Therefore, detection values of the output signals Vo output from the detection electrodes DE are also different among the first capacitor Ch1, the second capacitor Ch2, and the third capacitor Ch3.

That is to say, the display IC 50 can detect a portion with which the finger Fg comes into contact based on the output signals Vo. The input detection system 1h can assign different operations depending on the portions with which the finger Fg comes into contact, in addition to the detection of the position and angle (rotation operation RT) of an input support device 3h.

FIG. 21 illustrates an example in which the housing 30 is separated into the three portions as an example. The housing 30 is, however, not limited thereto and may be separated into two or equal to or more than four portions. The input support device 3h includes one first electrode 31 similarly to the first embodiment. The configuration is, however, not limited thereto and the fourth embodiment can be combined with the above-mentioned second embodiment, third embodiment, or various modifications.

Fifth Embodiment

Figure 22:
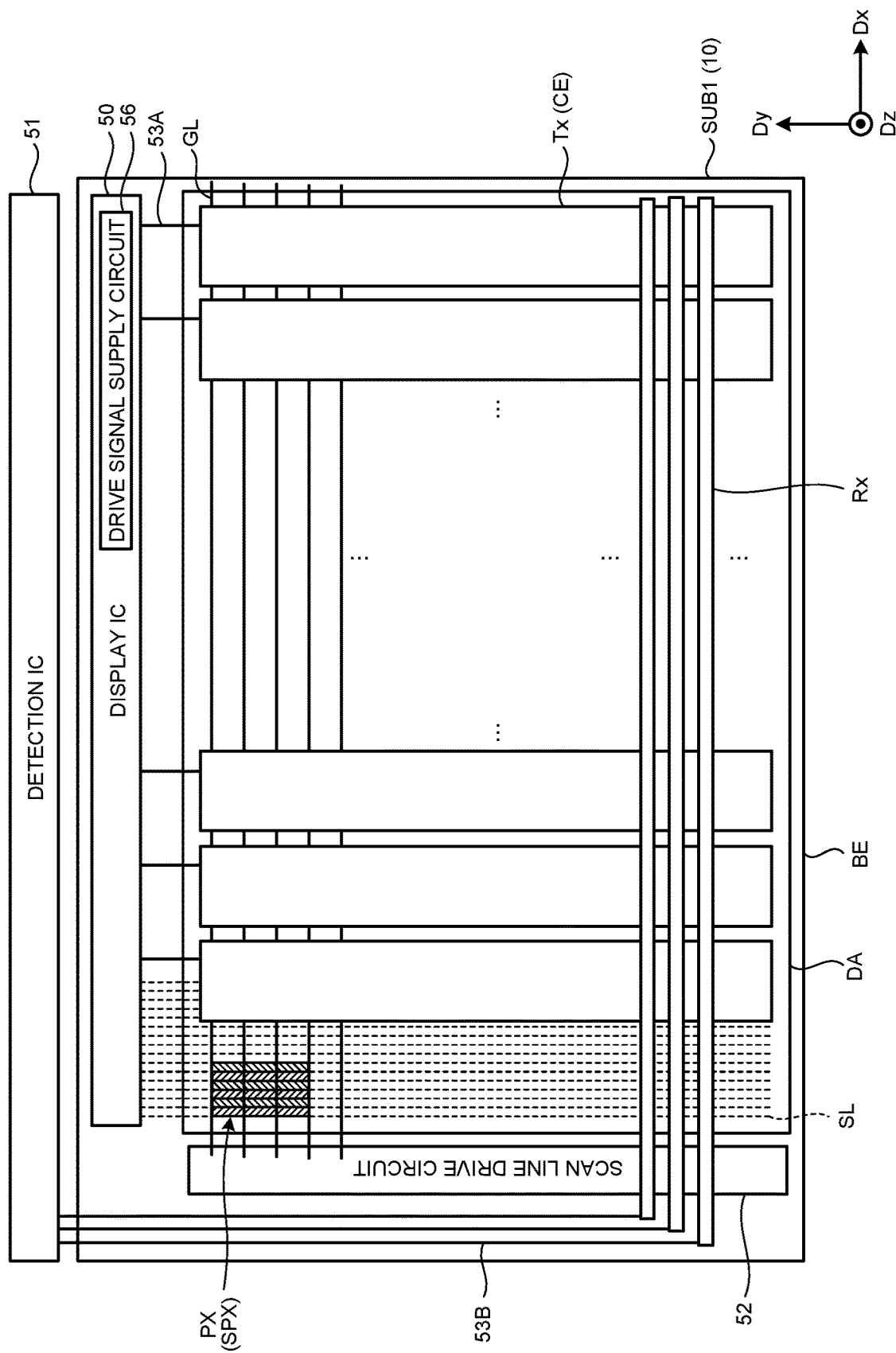
FIG. 22 is a plan view schematically illustrating an array substrate included in a display device according to a fifth embodiment.

FIG. 22 is a plan view schematically illustrating an array substrate included in a display device according to a fifth embodiment. In the above-mentioned first embodiment to fourth embodiment, the input support device 3 is arranged above the self-electrostatic capacitance-type (self-type) detection device (display device 2), as an example. The invention is, however, not limited thereto. The input detection system 1 and the input support device 3 can be applied to a mutual electrostatic capacitance-type (mutual-type) detection device (display device 2).

As illustrated in FIG. 22, the display device 2 includes a plurality of drive electrodes Tx and a plurality of detection electrodes (counter electrodes) Rx. FIG. 22 schematically illustrates some of the detection electrodes Rx provided on the counter substrate SUB2 in order to explain the relation between the drive electrodes Tx and the detection electrodes Rx. The drive electrodes Tx extend in the second direction Dy and are aligned in the first direction Dx. The drive electrodes Tx are coupled to the display IC 50 through coupling wiring lines 53A.

The detection electrodes Rx extend in the first direction Dx and are aligned in the second direction Dy. The detection electrodes Rx are coupled to the detection IC 51 through coupling wiring lines 53B. The drive electrodes Tx and the detection electrodes Rx intersect with each other in a plan view. Electrostatic capacitances are formed in intersecting portions between the drive electrodes Tx and the detection electrodes Rx. The detection IC 51 can detect the object to be detected based on the detection signals Vdet that are output in accordance with change in mutual electrostatic capacitances between the drive electrodes Tx and the detection electrodes Rx.

To be specific, in touch detection of detecting the position of the finger Fg, the display IC 50 (drive signal supply circuit 56) supplies the detection drive signal VD to the drive electrodes Tx, and the detection signals Vdet based on the change in the mutual electrostatic capacitances are output to the detection IC 51. The detection IC 51 thereby detects contact or proximity of the finger Fg.

In detection of the input support device 3, the display IC 50 (drive signal supply circuit 56) supplies the detection drive signal VD to the drive electrodes Tx, and the detection IC 51 detects a position and the like of the input support device 3 using the change in the mutual electrostatic capacitances and resonance of the LC circuit 35 included in the input support device 3.

Also in the mutual electrostatic capacitance type, the coupling portion N1 of the LC circuit 35 on the one end side in the input support device 3 is coupled to the reference potential GND through the housing 30 even when the number and drive pattern of drive electrodes Tx to which the detection drive signal VD is supplied in order are different. Accordingly, the input support device 3 can generate resonance of the LC circuit 35 using potential difference between the housing 30 and the first electrode 31 by the same driving system as that for the touch detection of detecting the object to be detected such as the finger Fg also in the mutual electrostatic capacitance type.

In the above-mentioned embodiments, the touch sensor is formed using the detection electrodes DE (or the drive electrodes Tx and the detection electrodes Rx) included in the display device 2. That is to say, the touch sensor is formed integrally with the display device 2 and shares some of the substrates and electrodes of the display device 2. The touch sensor is not limited to the one having the above-mentioned configuration and may be configured such that the detection electrodes DE (or the drive electrodes Tx and the detection electrodes Rx) are provided on a substrate as a separate member from the display device 2.

Sixth Modification

Figure 23:
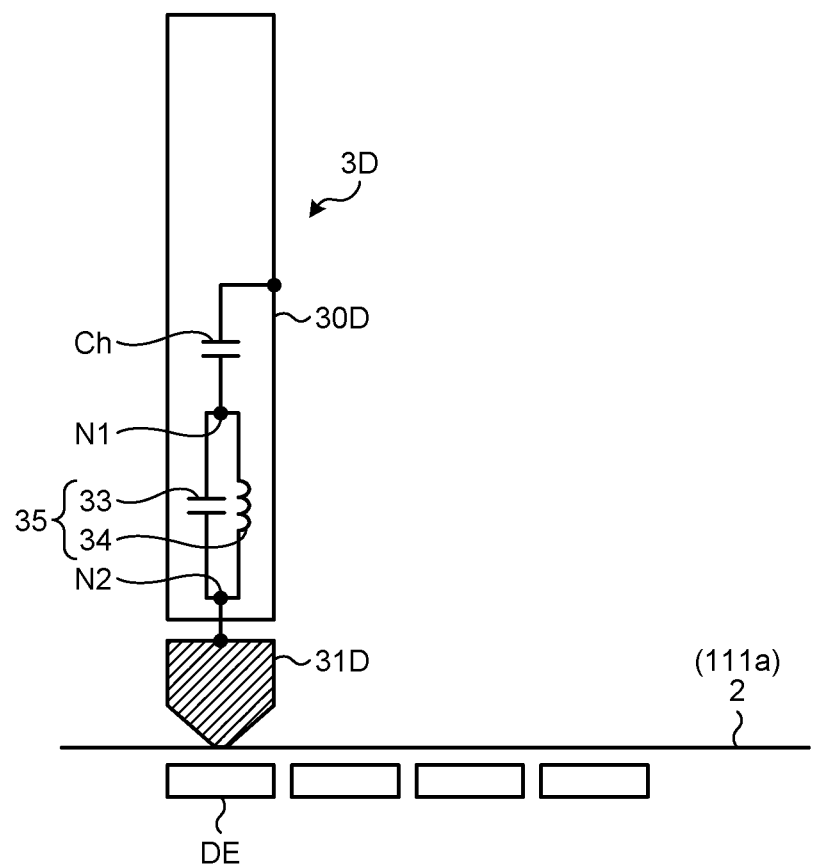
FIG. 23 is a descriptive view for explaining the configuration of an input support device in a sixth modification.

FIG. 23 is a descriptive view for explaining the configuration of an input support device in a sixth modification. As illustrated in FIG. 23, the input support device 3D in the sixth modification is, for example, the pen-type input support device 3D. The input support device 3D includes a housing 30D formed as a pen shaft and a first electrode 31D coupled to an end portion of the housing 30D.

The LC circuit 35 is accommodated in the housing 30D. The coupling portion N1 of the LC circuit 35 on the one end side is coupled to the housing 30D through the capacitor Ch. The coupling portion N2 of the LC circuit 35 on the other end side is coupled to the first electrode 31D.

When an operator performs an input operation by holding the housing 30D, the coupling portion N1 of the LC circuit 35 on the one end side is coupled to the reference potential GND through the housing 30D. Accordingly, the input support device 3D can generate resonance of the LC circuit 35 using potential difference between the first electrode 31D and the housing 30D.

Seventh Modification

Figure 24:
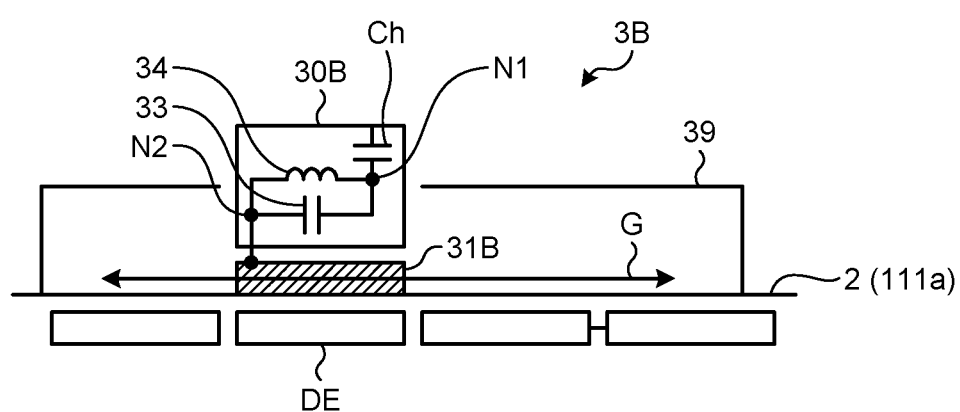
FIG. 24 is a descriptive view for explaining the configuration of an input support device in a seventh modification.

FIG. 24 is a descriptive view for explaining the configuration of an input support device in a seventh modification. As illustrated in FIG. 24, the input support device 3B in the seventh modification is, for example, the slider-type input support device 3B. The input support device 3B includes a housing 30B formed as a knob, a first electrode 31B joined to a lower portion of the housing 30B, and a guide 39.

The LC circuit 35 is accommodated in the housing 30B. The coupling portion N1 of the LC circuit 35 on the one end side is coupled to the housing 30B through the capacitor Ch. The coupling portion N2 of the LC circuit 35 on the other end side is coupled to the first electrode 31B.

The housing 30B and the first electrode 31B are integrally formed and are provided so as to be movable in the direction indicated by an arrow G along an extension direction of the guide 39. When an operator performs a slide operation on the housing 30B and the first electrode 31B by holding the housing 30B, the coupling portion N1 of the LC circuit 35 on the one end side is coupled to the reference potential GND through the housing 30B.

Also in various input support devices such as the input support devices 3D and 3B described in the sixth modification and the seventh modification, different input operations can be detected for the input support devices 3D and 3B by the same driving system as that for the touch detection of the finger Fg or the like. Each of the sixth modification and the seventh modification can also be combined with the above-mentioned first modification, second modification, or fourth embodiment.

Eighth Modification

Figure 25:
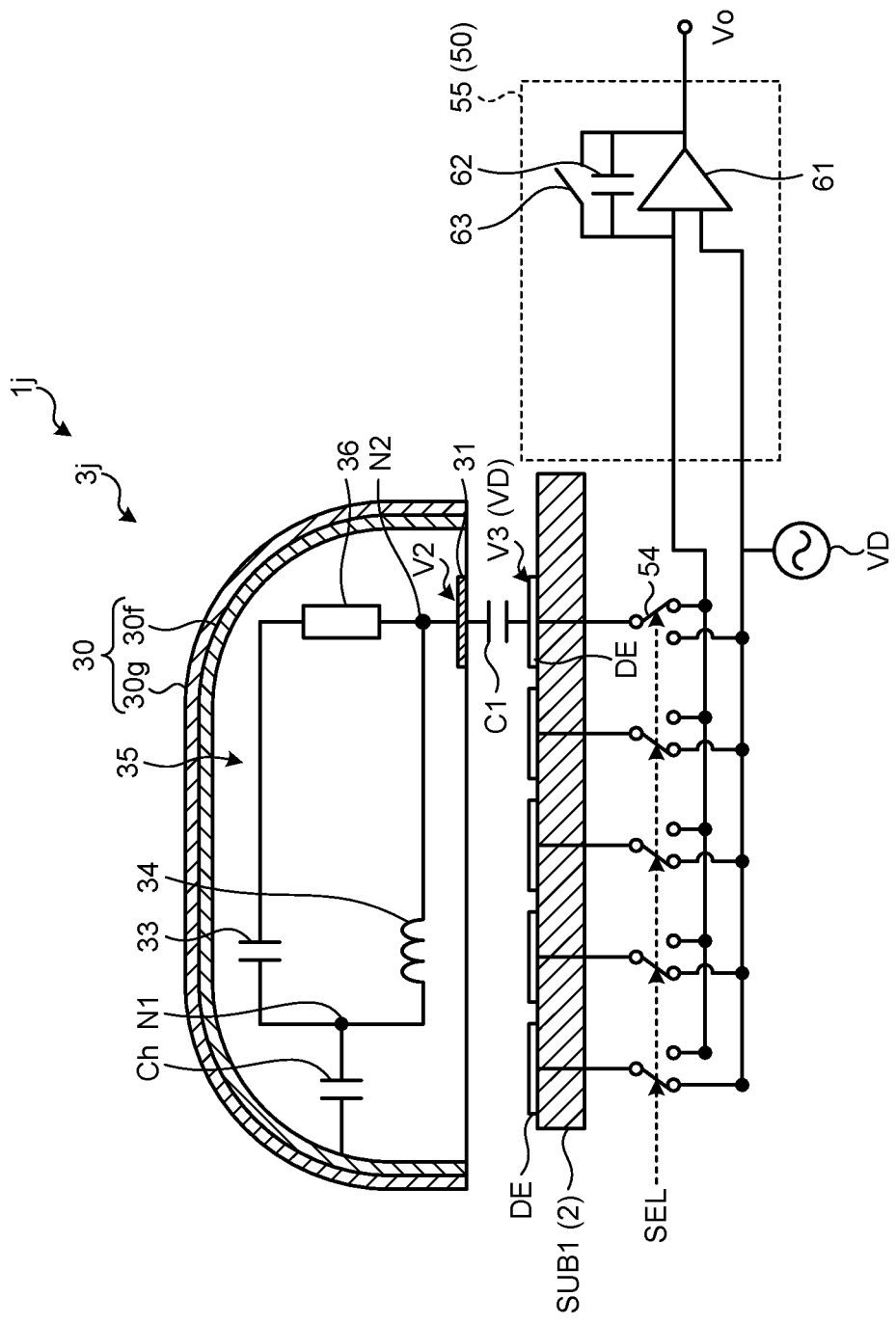
FIG. 25 is a descriptive view for explaining the configuration of an input support device in an eighth modification.

FIG. 25 is a descriptive view for explaining the configuration of an input support device in an eighth modification. As illustrated in FIG. 25, an input detection system 1j in the eighth modification is different from those in the above-mentioned embodiments in the configuration in which the housing 30 of an input support device 3j includes a first housing 30f and a second housing 30g.

The second housing 30g is stacked above the first housing 30f and is formed so as to cover the surface of the first housing 30f. The first housing 30f and the second housing 30g are formed to have projecting shapes and have openings formed on the array substrate SUB1 side. The first housing 30f is formed by a conductor and is coupled to the coupling portion N1 of the LC circuit 35 on the one end side through the capacitor Ch. The second housing 30g is formed by a non-conductor made of a resin material, for example.

In the eighth modification, the second housing 30g formed by the non-conductor is provided in a portion with which the finger Fg or the like comes into contact when the input support device 3j is operated. When the finger Fg comes into contact with the surface of the second housing 30g, the finger Fg and the first housing 30f formed by the conductor make capacitive coupling. The coupling portion N1 of the LC circuit 35 on the one end side is thereby coupled to the reference potential GND through the capacitor Ch, the first housing 30f, and the second housing 30g.

Although the preferred embodiments of the present disclosure have been described above, the present disclosure is not limited by these embodiments. Contents disclosed in the embodiments are merely examples, and various modifications can be made in a range without departing from the gist of the present disclosure. It is needless to say that appropriate modifications in a range without departing from the gist of the present disclosure belong to the technical scope of the present disclosure. At least one of various omission, replacement, and modification of the components can be performed in a range without departing from the gist of the embodiments and modifications described above.

What is claimed is:

1. An input detection system comprising:
a plurality of electrodes arrayed in a detection region; and
an input support device including
an LC circuit,
a first electrode coupled to the LC circuit and arranged so as to overlap with at least equal to or more than one of the electrodes,
a housing accommodating therein at least the LC circuit, and
a second electrode, wherein
the housing is a conductor,
one end side of the LC circuit is coupled to the housing through a coupling member or a capacitor and another end side of the LC circuit is coupled to the first electrode,
the first electrode and the second electrode are coupled in parallel to the other end side of the LC circuit, and
the first electrode and the second electrode are arranged so as to overlap with the electrodes differing from each other.

2. The input detection system according to claim 1, wherein an area of the first electrode is different from an area of the second electrode.

3. The input detection system according to claim 1, wherein a number of electrodes overlapping with the first electrode is different from a number of electrodes overlapping with the second electrode.

4. The input detection system according to claim 1, comprising a drive signal supply circuit configured to supply a drive signal to the electrodes, wherein
the drive signal supply circuit supplies the drive signal having a same potential to some of the electrodes overlapping with the first electrode and to the other electrodes overlapping with the second electrode.

5. An input detection system, comprising:
a plurality of electrodes arrayed in a detection region; and
an input support device including an LC circuit, a first electrode coupled to the LC circuit and arranged so as to overlap with at least equal to or more than one of the electrodes, a housing accommodating therein at least the LC circuit, wherein
the housing is a conductor,
one end side of the LC circuit is coupled to the housing through a coupling member or a capacitor and another end side of the LC circuit is coupled to the first electrode, the housing includes a first housing formed by a conductor and a second housing formed by a non-conductor, and the second housing is coupled to the first housing and is located between the electrodes provided in the detection region and the first housing.

6. An input detection system comprising:

a plurality of electrodes arrayed in a detection region; and an input support device including an LC circuit, a first electrode coupled to the LC circuit and arranged so as to overlap with at least equal to or more than one of the electrodes, a housing accommodating therein at least the LC circuit, wherein the housing is a conductor, one end side of the LC circuit is coupled to the housing through a coupling member or a capacitor and another end side of the LC circuit is coupled to the first electrode, the housing includes a first partial housing and a second partial housing that are separately provided, and the one end side of the LC circuit is coupled to the first partial housing through a first capacitor and is coupled to the second partial housing through a second capacitor.

7. The input detection system according to claim 1, wherein the one end side of the LC circuit is coupled to a reference potential through the housing.

8. The input detection system according to claim 1, further comprising a resistor element on the other end side of the LC circuit.

9. The input detection system according to claim 1, wherein the LC circuit, the first electrode, and the housing of the input support device are supported in a rotatable manner.

10. The input detection system according to claim 1, wherein the LC circuit, the first electrode, the second electrode, and the housing of the input support device are supported in a rotatable manner.

11. The input detection system according to claim 1, wherein the electrodes are arranged in a matrix with a row-column configuration in the detection region.

12. The input detection system according to claim 11, wherein each of the electrodes is coupled to a wiring line, and the wiring is provided so as to extend to outside of the detection region.

13. The input detection system according to claim 1, wherein the electrodes extend in a first direction and are aligned in a second direction intersecting with the first direction in the detection region.

14. The input detection system according to claim 13, wherein in the detection region, a plurality of counter electrodes forming electrostatic capacitances with the electrodes are further provided, and the counter electrodes extend in the second direction and are aligned in the first direction.

15. An input support device comprising:

an LC circuit;

a first electrode coupled to the LC circuit;

a housing accommodating therein at least the LC circuit; and a second electrode, wherein the housing is a conductor, one end side of the LC circuit is coupled to the housing through a coupling member or a capacitor and another end side of the LC circuit is coupled to the first electrode, and the first electrode and the second electrode are coupled in parallel to the other end side of the LC circuit.

16. The input support device according to claim 15, wherein the LC circuit, the first electrode, and the housing of the input support device are supported in a rotatable manner.

* * * * *